US012660025B2

(12) United States Patent
Velev et al.

(10) Patent No.:  US 12,660,025 B2
(45) Date of Patent:  Jun. 16, 2026

(54) DISABLING A PENDING NSSAI

(71) Applicant: Lenovo (Singapore) Pte. Ltd., New Tech Park (SG)

(72) Inventors: Genadi Velev, Darmstadt (DE); Roozbeh Atarius, La Jolla, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 541 days.

(21) Appl. No.: 18/247,254

(22) PCT Filed: Sep. 29, 2021

(86) PCT No.: PCT/IB2021/058971
§ 371 (c)(1),
(2) Date: Mar. 29, 2023

(87) PCT Pub. No.: WO2022/070116
PCT Pub. Date: Apr. 7, 2022

(65) Prior Publication Data
US 2023/0413360 A1      Dec. 21, 2023

Related U.S. Application Data

(60) Provisional application No. 63/085,054, filed on Sep. 29, 2020.

(51) Int. Cl.
*H04W 12/06* (2021.01)
*H04W 12/08* (2021.01)
(Continued)

(52) U.S. Cl.
CPC ........... *H04W 76/19* (2018.02); *H04W 48/18* (2013.01); *H04W 60/04* (2013.01); *H04W 76/18* (2018.02)

(58) Field of Classification Search
CPC ..... H04W 76/19; H04W 48/18; H04W 60/04; H04W 76/18; H04W 12/08; H04W 12/06
(Continued)

(56) References Cited

U.S. PATENT DOCUMENTS

2018/0317163 A1* 11/2018 Lee .......................... H04W 4/70
2022/0240174 A1*  7/2022 Kim ......................... H04W 4/50
(Continued)

OTHER PUBLICATIONS

PCT/IB2021/058971, "Notification of Transmittal of the International Search Report and the Written Opinion of the International Searching Authority, or the Declaration", International Searching Authority, Nov. 12, 2021, pp. 1-14.
(Continued)

*Primary Examiner* — Ayman A Abaza
*Assistant Examiner* — Tracy L Williams
(74) *Attorney, Agent, or Firm* — Kunzler Needham Hilton

(57) ABSTRACT

Apparatuses, methods, and systems are disclosed for disabling a pending NSSAI. One method includes receiving, from a lower layer, a first indication of a radio link failure event, wherein the radio link failure event occurs during an authentication procedure of a network slice, and wherein the radio link failure event corresponds to unavailable cell coverage and disabling a pending NSSAI associated with network slice based at least in part on the radio link failure event. The method includes receiving, from the lower layer and after disabling the pending NSSAI, a second indication indicating available cell coverage and transmitting a registration request for the network slice in response to the available cell coverage, wherein the registration request comprises a requested NSSAI, and wherein the request NSSAI comprises a S-NSSAI associated with the pending NSSAI.

20 Claims, 11 Drawing Sheets

(51) Int. Cl.
| | |
|---|---|
| *H04W 48/18* | (2009.01) |
| *H04W 60/04* | (2009.01) |
| *H04W 76/18* | (2018.01) |
| *H04W 76/19* | (2018.01) |

(58) Field of Classification Search
USPC ........................................................ 370/329
See application file for complete search history.

(56) References Cited

U.S. PATENT DOCUMENTS

| | | | |
|---|---|---|---|
| 2022/0272010 A1* | 8/2022 | Marquezan ............. | H04L 41/40 |
| 2023/0109272 A1* | 4/2023 | Ryu ................... | H04L 63/0892 |
| | | | 370/329 |

OTHER PUBLICATIONS

Lenovo, Motorola Mobility, "Discussion on network slice specific authorization and authentication failure", 3GPP TSG CT WG1 Meeting #126-e C1-206263, Oct. 15-26, 2020, pp. 1-3.

3GPP, "3rd Generation Partnership Project; Technical Specification Group Services and System Aspects; Procedures for the 5G System (5GS); Stage 2 (Release 16)", 3GPP TS 23.502 V16.5.0, Jul. 2020, pp. 1-594.

3GPP, "3rd Generation Partnership Project; Technical Specification Group Core Network and Terminals; Non-Access-Stratum (NAS) protocol for 5G System (5GS); Stage 3; (Release 16)", 3GPP TS 24.501 V16.5.1, Jul. 2020, pp. 1-709.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

DISABLING A PENDING NSSAI

CROSS-REFERENCE TO RELATED APPLICATIONS

This application claims priority to U.S. Provisional Patent Application No. 63/085,054 entitled "NETWORK SLICE SPECIFIC AUTHENTICATION AND AUTHORIZATION" and filed on Sep. 29, 2020 for Genadi Velev and Roozbeh Atarius, which application is incorporated herein by reference.

FIELD

The subject matter disclosed herein relates generally to wireless communications and more particularly relates to handling network slice specific authentication and authorization (NSSAA) failure.

BACKGROUND

In certain network, a NSSAA procedure may be required in order to allow access of a user equipment (UE) to a network slice which requires additional (i.e. secondary) authentication and authorization.

BRIEF SUMMARY

Disclosed are procedures for disabling a pending network slice selection assistance information (NSSAI). Said procedures may be implemented by apparatus, systems, methods, or computer program products.

One method of a UE for disabling a pending NSSAI includes receiving a radio link failure (RLF) trigger from a lower layer, where the RLF trigger occurs during an authentication procedure for a network slice, and disabling a pending NSSAI corresponding to the authentication procedure. The method includes receiving an indication from the lower layer that radio coverage is available and transmitting a Registration Request in response to the indication that radio coverage is available, where the Registration Request includes the network slice associated with the authentication procedure in a requested NSSAI.

One method of an Access and Mobility Management Function (AMF) for disabling a pending NSSAI includes receiving a RLF trigger from a Radio Access Network (RAN) node indicating RLF of a UE, where the RLF trigger occurs during an authentication procedure of a network slice. The method includes disabling a Pending NSSAI corresponding to the authentication procedure of the network slice and receiving a Registration Request from the UE, where the Registration Request identifies the network slice in a requested NSSAI.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
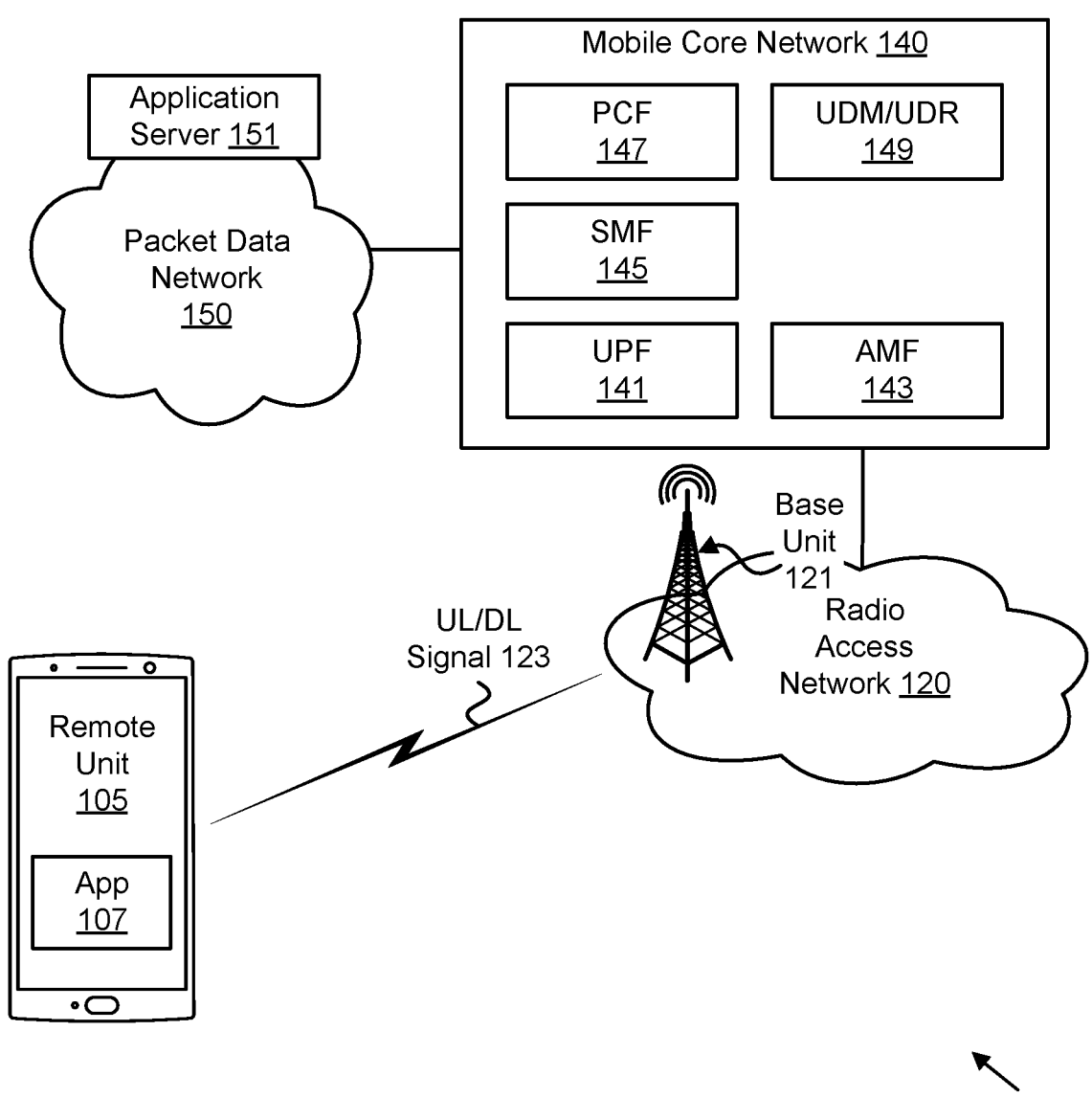
FIG. 1 is a block diagram illustrating one embodiment of a wireless communication system for disabling a pending NSSAI.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM) or Flash memory, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), wireless LAN (WLAN), or a wide area network (WAN), or the connection may be made to an external computer (for example, through the Internet using an Internet Service Provider (ISP)).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for disabling a pending NSSAI. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Currently for a 5G core network (5GC), the NSSAA procedure is defined in order to allow access of a UE to a network slice which requires additional authentication and authorization (i.e., secondary authentication/authorization). The network slice is identified by a single network slice selection assistance information (S-NSSAI). Only after successful NSSAA procedure, the network (e.g., 5GC), and more specifically the AMF and/or the Network Slice Selection Function ("NSSF"), includes the S-NSSAI in the Allowed NSSAI.

The NSSAA procedure is performed between the UE and the Authentication, Authorization, and Accounting (AAA) server (AAA-S) via the AMF whereas the authentication may be based on the extensible authentication protocol (EAP). The EAP messages are encapsulated and carried in Non-Access Stratum (NAS) protocol NSSAA messages between the UE and AMF. Between the AMF and NSSAAF the EAP messages are encapsulated in service-based message specific for NSSAAF.

However, during the NSSAA procedure a communication failure may happen. For example, the EAP messages—which are encapsulated in the NAS messages (e.g., NETWORK SLICE-SPECIFIC AUTHENTICATION COMMAND/RESULT messages)—may not be transmitted successfully between the UE and the AMF. With other words, the NSSAA procedure may start, but due to persistent transmission failure (e.g., RLF), the NSSAA may not be completed successfully.

One particular scenario for persistent transmission failure of the EAP messages is as follows: The UE initiates registration procedure with Requested NSSAI {X, Y}, where both {X} and {Y} are subject to NSSAA. Note here that {X} denotes a S-NSSAI for a slice 'X,' while {Y} denotes a S-NSSAI for a slice 'Y.' The network (e.g., AMF) sends to the UE a registration accept message including an empty Allowed NSSAI, Pending NSSAI (whereas the Pending NSSAI contains {X, Y}) and an indicator "NSSAA to be performed," e.g., in the 5GS registration result Information Element (IE). Here, the indicator "NSSAA to be performed" means that NSSAA procedure will be performed by the network.

In this scenario, the AMF initiates an EAP procedure for NSSAA for each S-NSSAI {X} and {Y}. Due to persistent transmission failure, the NSSAA procedure (including the transmission of the EAP message) cannot be completed. The persistent transmission failure can be at least one of: A) UE loses cell coverage, i.e., RLF is detected; or B) UE goes into a cell of a forbidden area or non-allowed area where the NAS messages are not allowed to be transmitted.

During the persistent transmission failure, the UE and/or the AMF try to transmit the outstanding EAP messages, but all transmissions and re-transmissions fail. Note that the EAP applications in the UE and in the AMF each have re-transmission timers which trigger re-transmissions. After determining the persistent transmission failure, the UE and/or the AMF terminate the NSSAA procedure.

In another scenario, the AMF may be able to complete the EAP signaling exchange for the NSSAA procedure, i.e., the transmission of the EAP messages between UE and AAA-S is completed whereas the result of the NSSAA procedure may be "success" or "failure," but the AMF may not be able to update the configuration in the UE. For example, the AMF is unable to update the UE with the updated allowed/Rejected NSSAI via the Configuration Update Command, since the UE is not yet reachable (e.g., due to communication (persistent transmission) failure). This means the AMF may not be able to send a new Allowed NSSAI and/or new Rejected NSSAI or delete the Pending NSSAI due to the loss of N1 connectivity.

Note that "N1 connectivity" refers to the NAS connection between the UE and the AMF, which exists only for a UE in Connected state (i.e., a UE releases its NAS connection when transitioning to Idle state and must re-establish a NAS connection when transitioning back to Connected state). However, it is unclear what the stored information is in the MM context in the UE and in the AMF: a) after NSSAA procedure is aborted due to the persistent transmission failure; or b) when the AMF is not able to update the UE with the NSSAA procedure result.

Also note that Third Generation Partnership Project (3GPP) Technical Specification (TS) 24.501 states that the NSSAA procedure "is transparent to the 5GMM layer of the UE." This means the NAS layer in the UE does not keep track on the exchanged EAP messages and the NAS layer cannot determine whether the NSSAA procedure for a particular S-NSSAI has been completed or not. In other words, the design of the existing NSSAA procedure is that the NAS layer in the UE is not aware whether the EAP signaling exchange for the NSSAA procedure has completed or not. A drawback of this layered protocol design in the existing NSSAA procedure is that the NAS layer in the UE stores the Pending NSSAI status as long as the network (e.g., AMF) performs an update and deletes/updates the Pending NSSAI.

Disclosed are solutions for recovering from NSSAA failure. In various embodiments, the UE is able to maintain a NSSAA failure timer with a value either preconfigured in the UE or received from the network. The NSSAA failure timer is started upon trigger of communication failure from lower layers. In one embodiment, upon events a) RLF from Access Stratum (AS) and/or Radio Resource Control (RRC) layer and/or b) expiration of a NSSAA failure timer, the UE may disable the Pending NSSAI (i.e., delete or mark as expired) without updating the Allowed NSSAI or Rejected NSSAI. The UE initiates a registration request procedure immediately after regaining the coverage in a situatable cell.

Regarding effects to the AMF, in various embodiments the AMF may be able to determine and configured the UE with a NSSAA failure guard time value. Upon inability to successfully complete the NSSAA procedure or to update the UE with the result of the NSSAA procedure, e.g., due to communication failure, the AMF disables the Pending NSSAI. The AMF may not store the NSSAA result and any of the status of the Pending NSSAI. The AMF may not put the S-NSSAIs from the Pending NSSAI neither in allowed nor in Rejected NSSAI. Upon disabling the Pending NSSAI, if the AMF is aware about the EAP result of the NSSAA procedure, then the AMF stores the EAP result. However, if the AMF is not aware of the EAP result of the NSSAA procedure, then the AMF may send indication to the AAA-S about the failure of the NSSAA procedure and indicate a new failure cause, e.g., communication failure.

FIG. 1 depicts a wireless communication system 100 for disabling a pending NSSAI, according to embodiments of the disclosure. In one embodiment, the wireless communication system 100 includes at least one remote unit 105, a RAN 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a Next Generation Radio Access Network (NG-RAN), implementing NR Radio Access Technology (RAT) and/or Long-Term Evolution (LTE) RAT. In another example, the RAN 120 may include non-3GPP RAT (e.g., Wi-Fi® or Institute of Electrical and Electronics Engineers (IEEE) 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access (WiMAX) or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants (PDAs), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit (WTRU), a device, or by other terminology used in the art. In various embodiments, the remote unit 105 includes a subscriber identity and/or identification module (SIM) and the mobile equipment (ME) providing mobile termination functions (e.g., radio transmission, handover, speech encoding and decoding, error detection and correction, signaling and access to the SIM). In certain embodiments, the remote unit 105 may include a terminal equipment (TE) and/or be embedded in an appliance or device (e.g., a computing device, as described above).

The remote units 105 may communicate directly with one or more of the base units 121 in the RAN 120 via uplink (UL) and downlink (DL) communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol (VoIP) application) in a remote unit 105 may trigger the remote unit 105 to establish a protocol data unit (PDU) session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function (UPF) 141.

In order to establish the PDU session (or PDN connection), the remote unit 105 must be registered with the mobile core network 140 (also referred to as "attached to the mobile core network" in the context of a Fourth Generation (4G) system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system (5GS), the term "PDU Session" refers to a data connection that provides end-to-end (E2E) user plane (UP) connectivity between the remote unit 105 and a specific Data Network (DN) through the UPF 141. A PDU Session supports one or more Quality of Service (QoS) Flows. In certain embodiments, there may be a one-to-one mapping between a QoS Flow and a QoS profile, such that all packets belonging to a specific QoS Flow have the same 5G QoS Identifier (5QI).

In the context of a 4G/LTE system, such as the Evolved Packet System (EPS), a Packet Data Network (PDN) connection (also referred to as EPS session) provides E2E connectivity between the remote unit and a PDN. The PDN connectivity procedure establishes an EPS Bearer, i.e., a tunnel between the remote unit 105 and a Packet Gateway (PGW) (not shown) in the mobile core network 140. In certain embodiments, there is a one-to-one mapping between an EPS Bearer and a QoS profile, such that all packets belonging to a specific EPS Bearer have the same QoS Class Identifier (QCI).

The base units 121 may be distributed over a geographic region. In certain embodiments, a base unit 121 may also be referred to as an access terminal, an access point, a base, a base station, a Node-B (NB), an Evolved Node B (abbreviated as eNodeB or eNB, also known as Evolved Universal Terrestrial Radio Access Network (E-UTRAN) Node B), a 5G/NR Node B (gNB), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core (EPC), which may be coupled to a packet data network 150, like the Internet and private data networks, among other data networks. A remote unit 105 may have a subscription or other account with the mobile core network 140. In various embodiments, each mobile core network 140 belongs to a single mobile network operator (MNO). The present disclosure is not intended to be limited to the implementation of any particular wireless communication system architecture or protocol.

The mobile core network 140 includes several network functions (NFs). As depicted, the mobile core network 140 includes at least one UPF 141. The mobile core network 140 also includes multiple control plane (CP) functions including, but not limited to, an AMF 143 that serves the RAN 120, a Session Management Function (SMF) 145, a Policy Control Function (PCF) 147, a Unified Data Management function (UDM) and a User Data Repository (UDR). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement (AKA) credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function (NRF) (which provides Network Function (NF) service registration and discovery, enabling NFs to identify appropriate services in one another and communicate with each other over Application Programming Interfaces (API)), a Network Exposure Function (NEF) (which is responsible for making network data and resources easily accessible to customers and network partners), an Authentication Server Function (AUSF), or other NFs defined for the 5GC. When present, the AUSF may act as an authentication server and/or authentication proxy, thereby allowing the AMF 143 to authenticate a remote unit 105. In certain embodiments, the mobile core network 140 may include an AAA-S.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband (eMBB) service. As another example, one or more network slices may be optimized for ultra-reliable low-latency communication (URLLC) service. In other examples, a network slice may be optimized for machine-type communication (MTC) service, massive MTC (mMTC) service, Internet-of-Things (IoT) service. In yet other examples, a network slice may be deployed for a specific application service, a vertical service, a specific use case, etc.

A network slice instance may be identified by a S-NSSAI while a set of network slices for which the remote unit 105 is authorized to use is identified by NSSAI. Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for disabling a pending NSSAI apply to other types of communication networks and RATs, including IEEE 802.11 variants, Global System for Mobile Communications (GSM) (i.e., a 2G digital cellular network), General Packet Radio Service (GPRS), Universal Mobile Telecommunications System (UMTS), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity (MME), a Serving Gateway (SGW), a PGW, a Home Subscriber Server (HSS), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station (BS), Access Point (AP), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for disabling a pending NSSAI.

Figure 2:
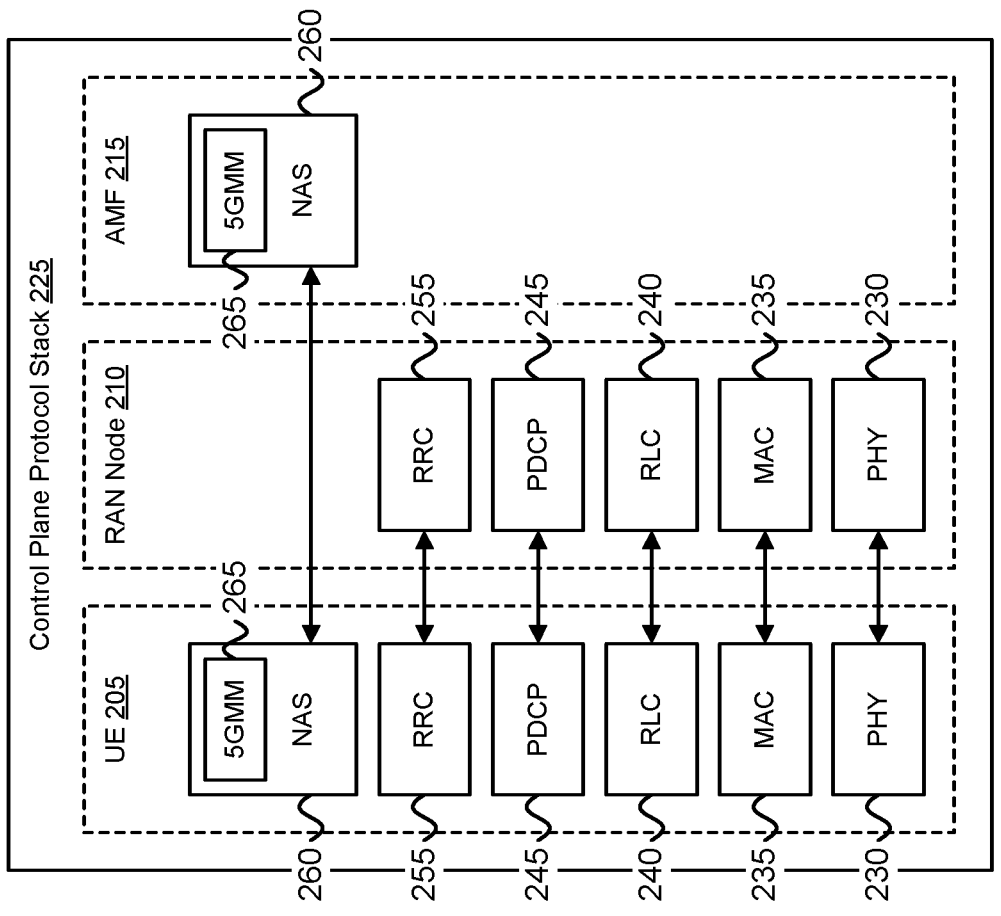
FIG. 2 is a block diagram illustrating one embodiment of a Fifth-Generation (5G) New Radio (NR) protocol stack.
Figure 2:
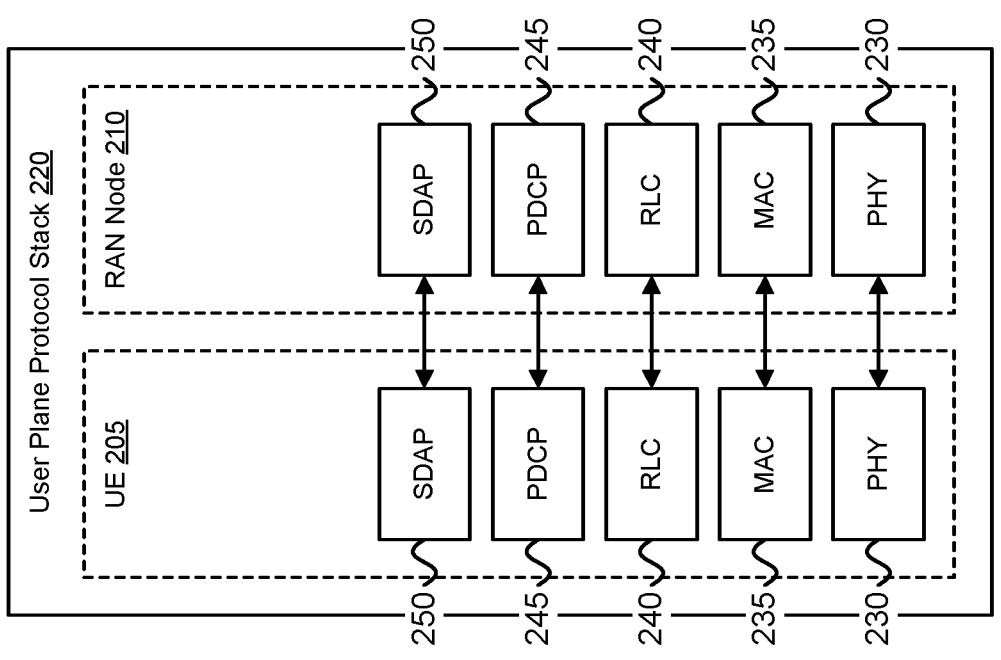

FIG. 2 depicts a NR protocol stack 200, according to embodiments of the disclosure. While FIG. 2 shows the UE 205, the RAN node 210 and an AMF 215 in a 5GC, these are representative of a set of remote units 105 interacting with a base unit 121 and a mobile core network 140. As depicted, the protocol stack 200 comprises a User Plane protocol stack 220 and a Control Plane protocol stack 225. The User Plane protocol stack 220 includes a physical (PHY) layer 230, a Medium Access Control (MAC) sublayer 235, the Radio Link Control (RLC) sublayer 240, a Packet Data Convergence Protocol (PDCP) sublayer 245, and Service Data Adaptation Protocol (SDAP) layer 250. The Control Plane protocol stack 225 includes a physical layer 230, a MAC sublayer 235, a RLC sublayer 240, and a PDCP sublayer 245. The Control Plane protocol stack 225 also includes an RRC layer 255 and a NAS layer 260. Note that the NAS layer 260 comprises a NAS 5G Mobility Management (5GMM) sub-layer 265.

The AS layer (also referred to as "AS protocol stack") for the User Plane protocol stack 220 consists of at least SDAP, PDCP, RLC and MAC sublayers, and the physical layer. The AS layer for the Control Plane protocol stack 225 consists of at least RRC, PDCP, RLC and MAC sublayers, and the physical layer. The Layer-2 (L2) is split into the SDAP, PDCP, RLC and MAC sublayers. The Layer-3 (L3) includes the RRC sublayer 255 and the NAS layer 260 for the control plane and includes, e.g., an Internet Protocol (IP) layer and/or PDU Layer (not depicted) for the user plane. L1 and L2 are referred to as "lower layers," while L3 and above (e.g., transport layer, application layer) are referred to as "higher layers" or "upper layers."

The physical layer 230 offers transport channels to the MAC sublayer 235. The physical layer 230 may perform a Clear Channel Assessment (CCA) and/or Listen-Before-Talk (LBT) procedure using energy detection thresholds, as described herein. In certain embodiments, the physical layer 230 may send a notification of UL LBT failure to a MAC entity at the MAC sublayer 235. The MAC sublayer 235 offers logical channels to the RLC sublayer 240. The RLC sublayer 240 offers RLC channels to the PDCP sublayer 245. The PDCP sublayer 245 offers radio bearers to the SDAP sublayer 250 and/or RRC layer 255. The SDAP sublayer 250 offers QoS flows to the core network (e.g., 5GC). The RRC layer 255 provides for the addition, modification, and release of Carrier Aggregation and/or Dual Connectivity. The RRC layer 255 also manages the establishment, configuration, maintenance, and release of Signaling Radio Bearers (SRBs) and Data Radio Bearers (DRBs).

The NAS layer 260 is between the UE 205 and the 5GC (i.e., AMF 215). NAS messages are passed transparently through the RAN. The NAS layer 260 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

The 5GMM sublayer 265 is used to track the location of the UE 205 and to manage UE registration in the 5GS. The 5GMM sublayer 265 also manages 5G NAS security and temporary identities of the UE, such as the 5G Globally Unique Temporary UE Identity (5G-GUTI). 5GMM procedures include (but are not limited to) the 5G NAS Registration, 5G NAS Deregistration, 5G NAS service, 5G NAS paging, UE configuration update, and 5G NAS Authentication procedures. Various 5GMM states and procedures are defined in 3GPP TS 24.501, clause 5.

Figure 3A:
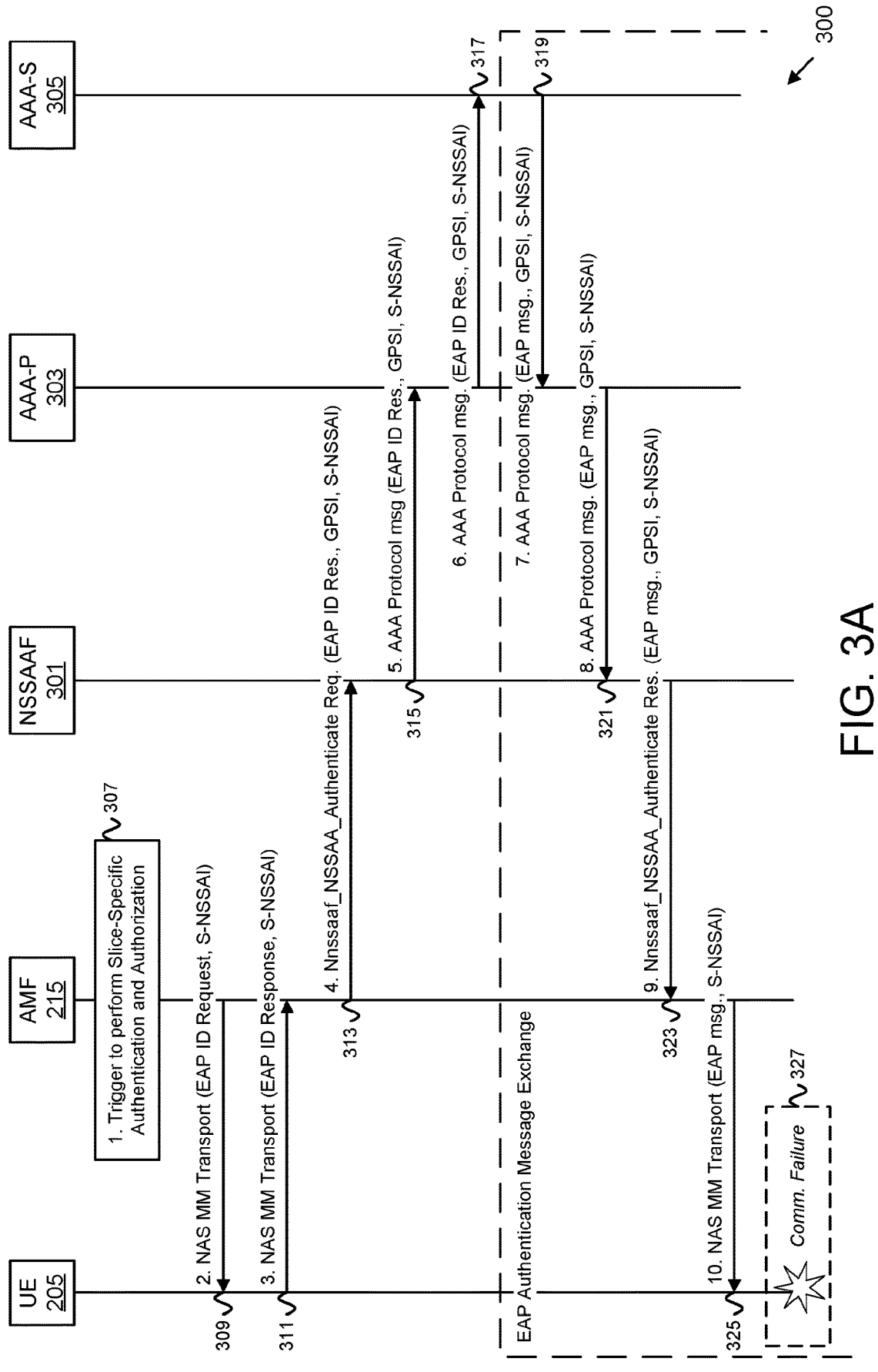
FIG. 3A is a call-flow diagram illustrating one embodiment of a NSSAA procedure.
Figure 3B:
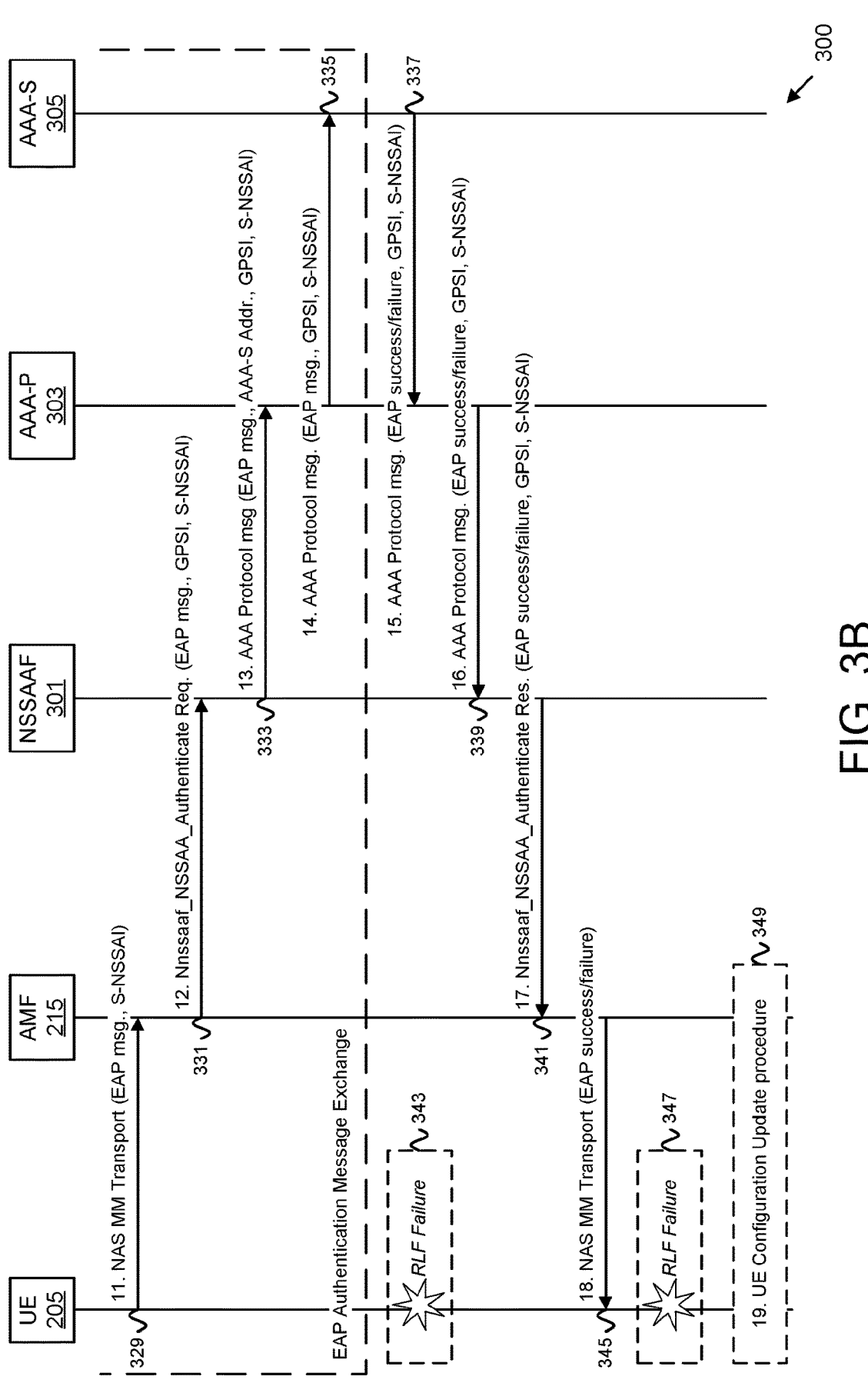
FIG. 3B is a continuation of FIG. 3A.

FIGS. 3A-3B depict a NSSAA procedure 300 for disabling a pending NSSAI, according to embodiments of the disclosure. The first procedure involves the UE 205, the AMF 215, a Network Slice-Specific Authentication and Authorization Function (NSSAF) 301, and an AAA-S 305. The UE 205 may be one embodiment of the remote unit 105, while the AMF 215 node 210 may be one embodiment of the AMF 143.

The NSSAA procedure 300 is triggered for an S-NSSAI requiring additional/secondary authentication, i.e., NSSAA, with the AAA-S 305. In one embodiment, the AAA-S 305 is a NF hosted by a home Public Mobile Land Network (PLMN) of the UE 205. In other embodiments, the AAA-S 305 belongs to a third party having a business relationship (i.e., Service-Level Agreement (SLA)) with the home PLMN operator. In the latter embodiments, the procedure 300 additionally involves an AAA Proxy (AAA-P) 303, e.g., located between the NSSAAF 301 and the AAA-S 305.

The NSSAA procedure 300 includes authentication and authorization of the UE 205 performed from the AAA-S 305. The authentication-and-authorization is based on the EAP and the authentication mechanism may be determined by the AAA-S 305. The EAP signaling exchange between the UE 205 and the AAA-S 305 goes via the AMF 215, which acts as the EAP authenticator according to the EAP mechanism. Between the UE 205 and the AMF 215, the EAP messages are encapsulated and carried in NAS MM protocol messages, discussed in greater detail with reference to FIG. 3A, Step 2, and FIG. 4. Note that the NSSAAF 301 relays EAP messages between the AMF 215 and the AAA-S 305 (or AAA-P 303). Additionally, the NSSAAF 301 may provide AAA protocol interworking where needed.

At Step 1, for S-NSSAIs that are requiring NSSAA (e.g., based on UE requesting to register with the S-NSSAI, change of subscription information or triggered by the AAA-S 305), the AMF 215 may trigger the start of the NSSAA procedure 300 (see block 307). Note that communication failure in the AS layer (i.e., persistent transmission failure, such as RLF) may occur at any of the following steps.

At Step 2, the AMF 215 sends an EAP Identity Request for the S-NSSAI in a NAS MM Transport message including the S-NSSAI (see messaging 309). Please note that the NAS MM Transport message is used as a general term which may include NAS NSSA-Command, NSSA-Complete, and/or NSSA-Result messages, as described in FIG. 4. As discussed above, prior to the start of the NSSAA procedure 300, the AMF 215 may configure a Pending NSSAI, e.g., by sending to the UE 205 a Registration Accept message with the Pending NSSAI which contain this S-NSSAI. This means that already in Step 2 the UE 205 and the AMF 215 store the Pending NSSAI in the NAS layer MM context.

At Step 3, the UE 205 provides the EAP Identity Response for the S-NSSAI, alongside the S-NSSAI, in an NAS MM Transport message towards the AMF 215 (see messaging 311).

At Step 4, the AMF 215 sends the EAP Identity Response to the NSSAAF 301 in a Nnssaaf_NSSAA_Authenticate Request (i.e., containing the EAP Identity Response, an address of the AAA-S 305, a GPSI, and the S-NSSAI) (see messaging 313).

At Step 5, the NSSAAF 301 forwards the EAP ID Response message towards the AAA-S 305. If the AAA-P 303 is present (e.g., because the AAA-S 305 belongs to a third party and the operator deploys a proxy towards third parties), then the NSSAAF 301 forwards the EAP ID Response message to the AAA-P 303 (see messaging 315). Otherwise, the NSSAAF 301 forwards the message directly to the AAA-S 305. The NSSAAF 301 uses towards the AAA-P 303 or the AAA-S 305 an AAA protocol message of the same protocol supported by the AAA-S 305.

At Step 6, the AAA-P 303 forwards the EAP Identity message to the AAA-S 305, e.g., addressable by the AAA-S address together with S-NSSAI and GPSI (see messaging 317). The AAA-S 305 stores the GPSI to create an association with the EAP Identity in the EAP ID response message, so the AAA-S 305 can later use it to revoke authorization and/or to trigger reauthentication.

At Steps 7-14, EAP-request/response messages are exchanged between the UE 205 and the AAA-S 305. Note that one or more than one iteration of these steps may occur. Specifically, at Step 7, the AAA-S 305 sends an EAP authentication request message to the AAA-P 303, encapsulated in AAA protocol message (see message 321). At Step 8, the AAA-P 303 forwards the EAP authentication request message to the NSSAAF 301 (see message 323).

At Step 9, the NSSAAF 301 forwards the EAP authentication request message to the AMF 215 (see message 323). The NSSAAF 301 performs interworking by translating the AAA protocol message to NSSAA authentication messages. At Step 10, the AMF 215 provides the EAP authentication request message in an NAS MM Transport message towards the UE 205 (see messaging 325).

According to a first case (Case A), a communication failure 327 in the AS layer may occur after Step 2 and before Step 11. In this case the NSSAA signaling exchange has started, but the EAP procedure could not be completed. In other words, the EAP procedure may time out and the AAA-S 305 and AMF 215 may determine this situation and will know that the EAP procedure (i.e., probably all ongoing EAP procedures for each of the S-NSSAIs from the Pending NSSAI) is terminated. While FIG. 3A shows the communication failure 327 in the AS layer as occurring after Step 10, the communication failure 327 in the AS layer may occur at any time after Step 2 and before Step 11.

Continuing on FIG. 3B, at Step 11, the UE 205 provides a EAP authentication response message in an NAS MM Transport message towards the AMF 215 (see messaging 329). At Step 12, the AMF 215 sends the EAP authentication response message to the NSSAAF 301 (see message 331).

At Step 13, the NSSAAF 301 forwards the EAP authentication response message to the AAA-P 303, when present (see message 333). At Step 14, the AAA-P 303 forwards an EAP authentication response message to the AAA-S 305, encapsulated in AAA protocol message (see message 335). As noted above, one or more iterations of Steps 7-14 may occur.

At Step 15, EAP authentication completes. The AAA-S 305 stores the S-NSSAI for which the authorization has been granted, so it may decide to trigger reauthentication and reauthorization based on its local policies. An EAP-Success/Failure message is delivered to the AAA-P 303 in an AAA Protocol message with the GPSI and S-NSSAI (see messaging 337). Note that if the AAA-P 303 is not present, then the AAA-S 305 sends the AAA Protocol message directly to the NSSAAF 301.

At Step 16, if the AAA-P 303 is used, then the AAA-P 303 sends an AAA Protocol message including [EAP-Success/Failure, S-NSSAI, GPSI] to the NSSAAF 301 (see messaging 339).

At Step 17, the NSSAAF 301 sends the Nnssaaf_NS-SAA_Authenticate Response [EAP-Success/Failure, S-NS-SAI, GPSI] to the AMF 215 (see messaging 341).

According to a second case (Case B), a communication failure 343 in the AS layer may occur after Step 11 and before Step 18. In this case the EAP procedure has been completed on the network side, i.e., between the AMF 215 and the AAA-S 305, but the UE 205 is not updated yet with the EAP result. Thus, the AMF 215 and AAA-S 305 will be aware and store the EAP procedure result, e.g., success or failure, even though the UE 205 does not know the EAP result. While FIG. 3B shows the communication failure 343 in the AS layer as occurring after Step 14, the communication failure 343 in the AS layer may occur at any time after Step 11 and before Step 18.

At Step 18, the AMF 215 transmits a NAS MM Transport message, e.g., Network Slice-Specific Authentication (NSSA) Result message, containing the EAP result (EAP-Success/Failure) to the UE 205 (see messaging 345). Here, the AMF 215 stores the EAP result for each S-NSSAI for which the NSSAA procedure in steps 1-17 was executed.

According to a third case (Case C), a communication failure 347 in the AS layer may occur after Step 18 and before Step 19. In this case all EAP entities, i.e., UE 205, AMF 215 and AAA-S 305 are aware and store the EAP result, but the UE 205 is not updated yet with the new Allowed NSSAI or Rejected NSSAI or pending NSSAI, as Step 19 couldn't be executed. In this document the general term "NSSAI configuration" may be used to express any of the combinations of the Allowed NSSAI, Rejected NSSAI or pending NSSAI.

At conditional Step 19, if a new Allowed NSSAI (i.e. including any new S-NSSAIs in a Requested NSSAI for which the NSSAA EAP procedure succeeded and/or excluding any S-NSSAI(s) in the existing Allowed NSSAI for the UE for which the procedure has failed) and/or new Rejected S-NSSAIs (i.e. including any S-NSSAI(s) in the existing Allowed NSSAI for the UE 205 for which the procedure has failed, or any new requested S-NSSAI(s) for which the NSSAA EAP procedure failed) need to be delivered to the UE 205, or if AMF re-allocation is required, then the AMF 215 initiates a UE Configuration Update (UCU) procedure, for each Access Type (see block 349).

Figure 4:
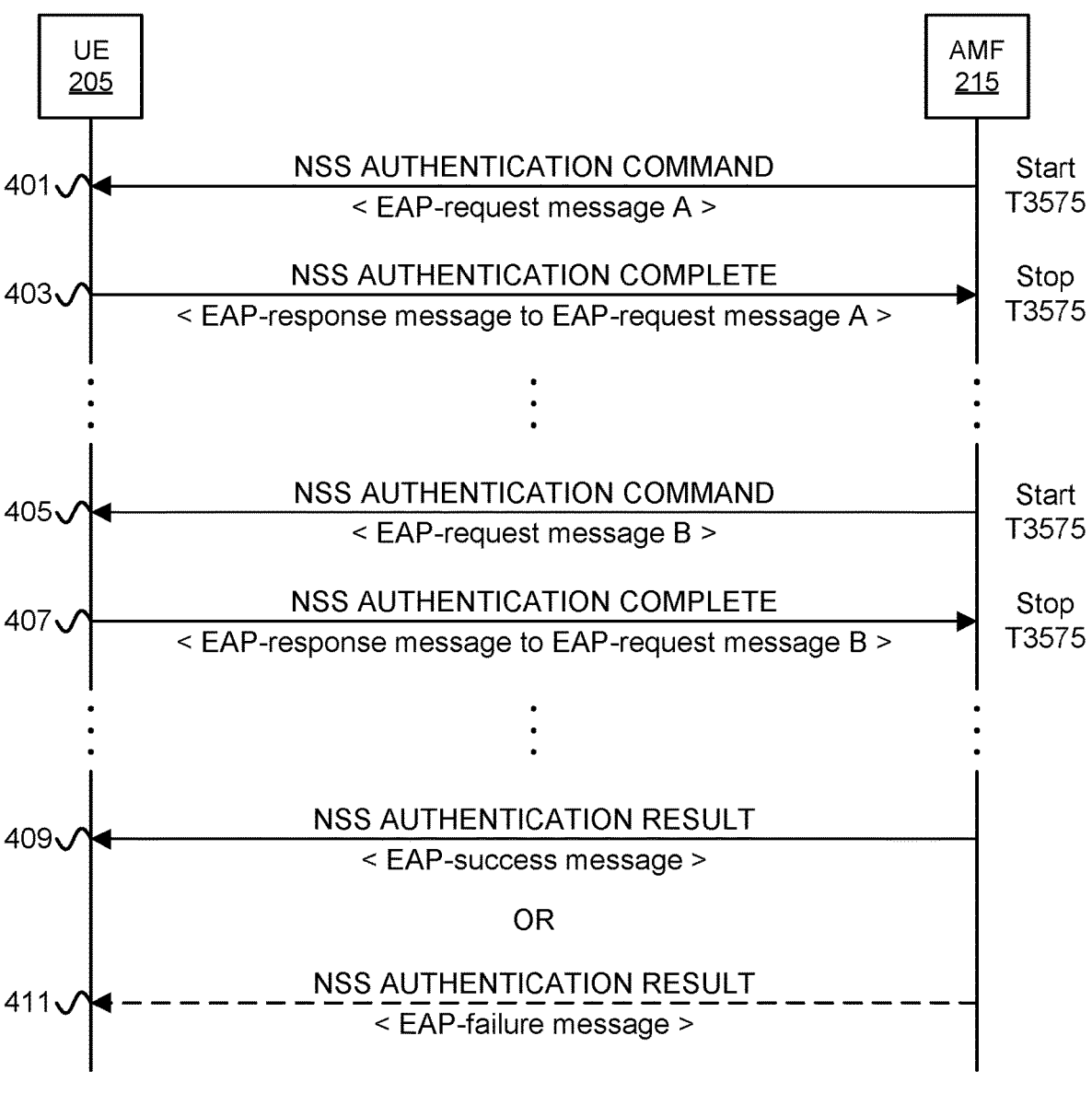
FIG. 4 is a call-flow diagram illustrating one embodiment of NSSAA procedure signaling exchange between a UE and an AMF.

FIG. 4 depicts NAS signaling exchange 400 between the UE 205 and the AMF 215 for a NSSAA procedure. Here, the NAS signaling exchange 400 may be representative of Steps 2-3, 10-11, and 18 of FIGS. 3A-3B. As depicted, the AMF 215 sends a NSSA Command message 401 containing an EAP-request message (i.e., "Message A"). The UE 205 prepares an EAP-response message to the EAP-request Message A and sends the EAP-response message to the AMF 215 in a Network Slice-Specific Authentication Complete message 403. If the Network Slice-Specific Authentication Command message 401 containing an EAP-request Message A is unsuccessfully received, then the AMF 215 may send one or more retransmissions of the message 401.

The UE 205 and AMF 215 continue to exchange EAP messages until the NSSAA procedure completes. In the depicted embodiment, the AMF 215 sends a Network Slice-Specific Authentication Command message 405 containing an EAP-request message (i.e., "Message B"). The UE 205 prepares an EAP-response message to the EAP-request Message B and sends the EAP-response message to the AMF 215 in a Network Slice-Specific Authentication Complete message 407. Again, if the Network Slice-Specific Authentication Command message 405 containing an EAP-request Message B is unsuccessfully received, then the AMF 215 may send one or more retransmissions of the message 405. Upon successful completion of NSSAA, the AMF 215 sends to the UE 205 a Network Slice-Specific Authentication Result message 409 containing an EAP-success message. If the NSSAA is unsuccessful, the AMF 215 sends to the UE 205 a Network Slice-Specific Authentication Result message 411 containing an EAP-failure message.

The timer used in the AMF 215 to trigger the re-transmission of NAS NSSAA command/result messages is called T3575. Note that the timer T3575 is a 5GS mobility management timer defined in 3GPP TS 24.501, Clause 10.2. The timer T3575 typically has a value of 15 seconds, is initiated/started upon transmission of the NETWORK SLICE-SPECIFIC AUTHENTICATION COMMAND message (i.e., message 401 or 405) and stopped upon receiving the NETWORK SLICE-SPECIFIC AUTHENTICATION COMPLETE message (i.e., message 403 or 407). According to 3GPP TS 24.501, on expiry of the T3575 timer, the AMF 215 is to retransmit the NETWORK SLICE-SPECIFIC AUTHENTICATION COMMAND message.

Because the NAS layer 260 in the UE 205 does not keep track on the exchanged EAP messages, the NAS layer 260 cannot determine whether the NSSAA procedure for a particular S-NSSAI has been completed or not. Thus, the NAS layer 260 in the UE 205 is not aware whether the EAP signaling exchange for the NSSAA procedure has completed or not.

To remedy the above noted problems relating to NSSAA failure, the following solutions may be implemented. At the AMF 215, upon inability to complete the NS SAA procedure (i.e., to complete the EAP exchange) or inability to update the UE 205 after the NSSAA procedure has been completed (e.g., due to communication failure as described above with reference to FIG. 3A-3B), the AMF 215 disables the Pending NSSAI and either: A) does not update the Allowed NSSAI and/or the Rejected NSSAI; or B) updates the Allowed NSSAI and/or the Rejected NSSAI (i.e., depending on the result of the NSSAA procedure for the S-NSSAIs from the Pending NSSAI) and flags the Allowed NSSAI and/or Rejected NSSAI with 'not sent to the UE'.

At the UE 205, upon release of the N1 connectivity due to communication failure (e.g., as describe above again with reference to FIGS. 3A-3B), and if the UE 205 stores a Pending NSSAI, the UE 205 may A) disable the Pending NSSAI; or B) start a guard timer and upon expiration of the guard timer disable the Pending NSSAI. In other words, based on the above principles, the UE 205 determines that the NSSAA procedure has failed, and the UE 205 decides to disable the Pending NSSAI (i.e., all S-NSSAIs from the Pending NSSAI). Further, the UE 205 sets an internal flag that registration request message for mobility update needs to be sent to the network upon regaining of radio coverage.

On the UE side, it is possible that a failure of the NSSAA procedure is determined in the upper layer, e.g., in an EAP (client) application. For example, the EAP application may be waiting for a message, i.e., EAP authentication/authorization complete message, indicating that the EAP authentication/authorization procedure is completed but the message does not arrive. In such a case, the upper layer may indicate to the NAS layer 260 that the NSSAA procedure could not be completed. One drawback of the NAS layer 260 relying on indication from upper layer is that there is dependency (or requirement) on the implementation of an upper layer. If the implementation of the upper is not correct, that the NAS layer 260 will not operate properly.

Therefore, in some solutions, the UE 205 may conclude that the NSSAA procedure has failed based on the expiration of a guard time which starts after the N1 connectivity has been lost due to causes such as RLF or other AS) layer failures. The guard timer may be needed in case that the NAS NSSAA command/result messages, e.g., NETWORK SLICE-SPECIFIC AUTHENTICATION COMMAND, NETWORK SLICE-SPECIFIC AUTHENTICATION RESULT, from the AMF 215 has longer retransmission timers than the RLF detection duration. For example, if the RLF detection duration is shorter than the retransmission of NAS NSSAA command/result messages, it may happen that the AS layer triggers RLF failure and after a short time, the coverage is regained, and the AMF 215 is able to retransmit successfully the NAS NSSAA command/result messages. To avoid situations that the AS layer declares RLF failure due to having shorter reconnection time period than the NAS message retransmission, the guard timer may be introduced.

In one embodiment, the guard time value may be configured in the UE 205 from the manufacturer. In another embodiment, the guard time value may be configured in the Universal Subscriber Identity Module (USIM) data (from the home network operator) and the NAS layer 260 retrieves the guard time value from the USIM. In another embodiment, the guard time value may be sent to the UE 205 from the network (e.g., AMF 215). For the latter case, a new NAS IE may be used, e.g., called "NSSAA guard time after lower layer failure triggers," or an existing IE can be enhanced/extended to contain the guard time value. For example, the Registration Accept message may be enhanced with one of the following options:

Option 1: The "5GS Registration Result" IE may be extended to include the new guard time value. This would be consistent with the existing "NSSAA to be performed" indicator which is included in the "5GS Registration Result" IE.

Option 2: The "Pending NSSAI" IE may be enhanced to include the guard time value.

The AMF 215 may calculate the values of the guard time depending on a) the time values used in the RAN 120 for RLF and b) the retransmission time values set for the NAS NS SAA command/result messages. For example, if the RLF time is 31 seconds, and the NAS NSSAA command/result messages are transmitted 4 times in total, where each re-transmission is triggered by a 10 second timer, then the AMF 215 may calculate a guard time whose value is larger than or equal to [4×10−31]=9 seconds.

In various embodiments, the formula for the calculation of the guard time may be generalized as one of:

Option A: Guard time⇒[NoOfTransmissions×T3575]−[RLF time], where the argument "⇒" means "larger than or equal to," the parameter "NoOfTransmissions" means the total number of transmissions of NAS NSSAA command/result messages (i.e., the initial transmission and the maximum number of retransmissions permitted), and the parameter "RLF time" is the time for determining RLF. Accordingly, the re-transmission from the AMF 215 is based on the T3575 timer. Note that the above example of a 9-second guard time was calculated according to Option A.

Option B: Guard time⇒NoOfTransmissions×T3575, where the argument "⇒" means "larger than or equal to" and the parameter "NoOfTransmissions" means the total number of transmission of NAS NSSAA command/result messages. Again, the re-transmission from the AMF 215 is based on the T3575 timer. Note that Option B is a more conservative approach giving the UE 205 a larger guard time before disabling the Pending NSSAI. In the above example, the guard time according to Option B would have a value of 40 seconds, instead of 9 seconds.

Note that the UE 205 is in 5GMM-REGISTERED state after receiving the Registration Accept message. However, during the subsequent NSSAA procedure, the UE 205 may experience a communication failure, which may be at least one of: A) the UE 205 experiences persistent coverage loss which triggers RLF, B) the UE 205 enters forbidden area, C) the UE 205 enters non-allowed area, and/or D) the RRC connection is dropped, e.g., due to signaling radio bearer (SRB) pre-emption and following access barring.

In any of the above cases, the UE 205 may either not be able or not be allowed to continue, e.g., to re-establish, the N1 connection with the AMF 215. In any of the cases A) to D), the AS layer in the UE 205 may detect the failure when the UE 205 is in RRC-Connected state. Here, it is assumed that the AS layer indicates to the NAS layer 260 the RRC-Connected state failure, e.g., with an associated failure cause (like RLF). In certain embodiments, the UE 205 may transition to the RRC-Idle state and may notify the NAS layer 260 of the same.

After the AS layer indicates the communication failure (e.g., causing N1 connection failure), the 5GMM (sub)state in the UE 205 would change to one of: A) "5GMM-REGISTERED.NO-CELL-AVAILABLE" substate; B) "5GMM-REGISTERED.LIMITED-SERVICE" substate; or C) "5GMM-DEREGISTERED" which may be due to the Allowed NSSAI is empty.

Because the NAS layer 260 has had an ongoing NSSAA procedure, after the AS layer indicates one of the communication failures listed above, the NAS layer 260 in the UE 205 may perform one or more of the following:

Option 1: Upon indication from the EAP application that the EAP procedure for NSSAA is not completed, disable the Pending NSSAI, i.e., delete or mark as expired, for which the NSSAA has not been completed and keep the Allowed NSSAI and Rejected NSSAI as configured in the UE 205 by the AMF 215.

Option 2: Subscribe with the AS layer for notification when coverage is regained, i.e., a connection may be established again in the same cell or when a suitable cell becomes available.

Option 3: Set an internal flag that registration request for mobility update needs to be sent to the network upon regaining coverage.

Accordingly, if the UE 205 stores a Pending NSSAI and the UE 205 enters one of the states "5GMM-REGISTERED.NO-CELL-AVAILABLE" or "5GMM-REGISTERED.LIMITED-SERVICE", and optionally upon expiry of a guard time, then the UE 205 disables the Pending NSSAI.

Similarly, in the AMF 215, upon receiving an N1 connection release indication from the access network, e.g., RAN or Non-3GPP Interworking Function (N3IWF), or Trusted Non-3GPP Gateway Function (TNGF), the AMF 215 may terminate the NSSAA procedure with the AAA-S 305, i.e., the AMF 215 informs the AAA-S 305 about the failure of the NSSAA procedure. The AMF 215 may then disable, meaning delete or mark as expired, the Pending NSSAI for which the NSSAA has not been completed.

Later, when the UE 205 enters in a suitable cell coverage, or upon PLMN re-selection, the 5GMM substate may change to one of: A) "5GMM-REGISTERED.ATTEMPT-ING-REGISTRATION-UPDATE"; or B) "5GMM-REGIS-TERED.UPDATE-NEEDED".

The UE 205 may perform registration procedure for mobility registration update, after indication from lower layer, e.g., AS layer, that it is in cell coverage again.

Figure 5A:
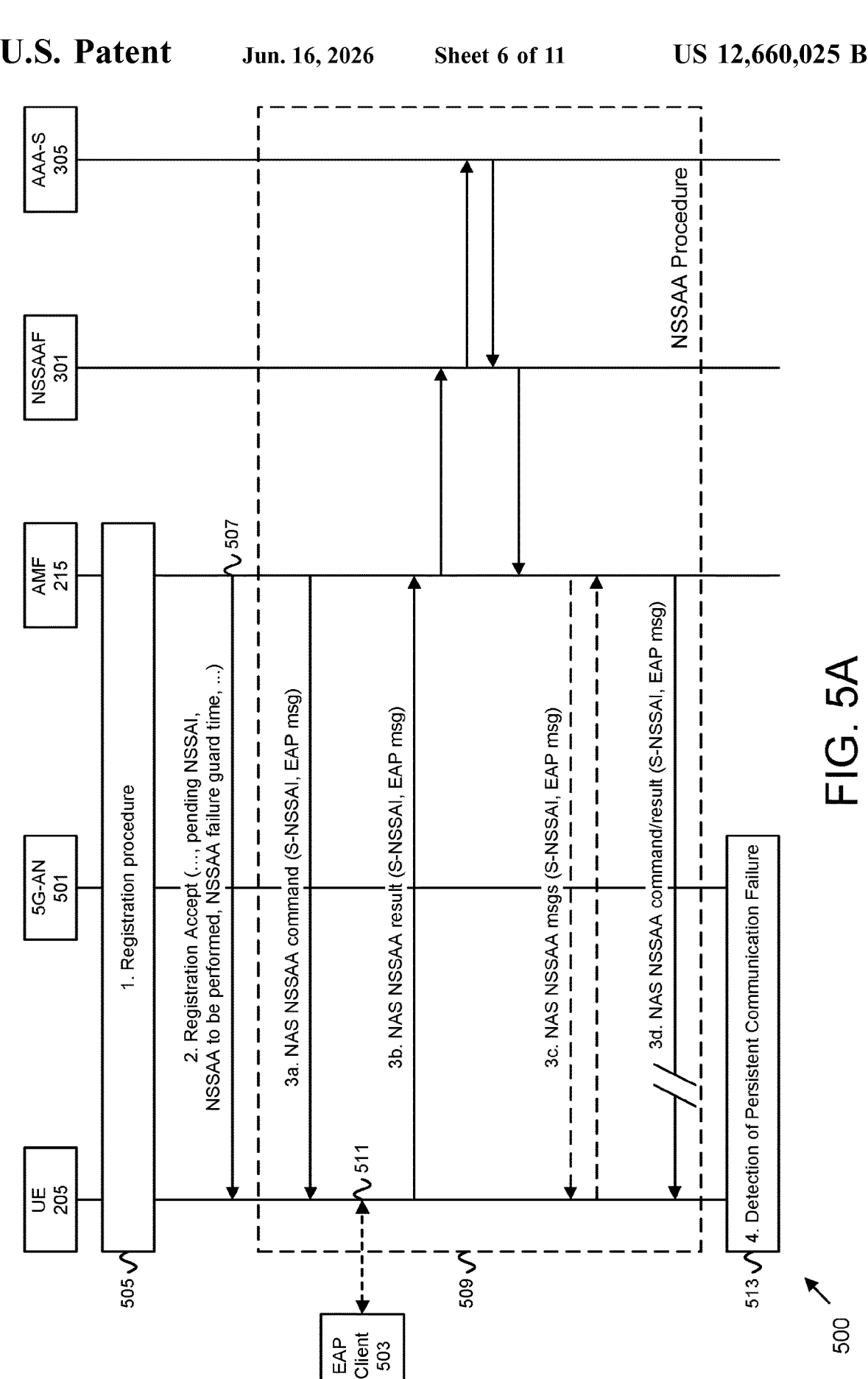
FIG. 5A is a call-flow diagram illustrating one embodiment of a signaling flow for the scenario of communication failure resulting in NSSAA failure.
Figure 5B:
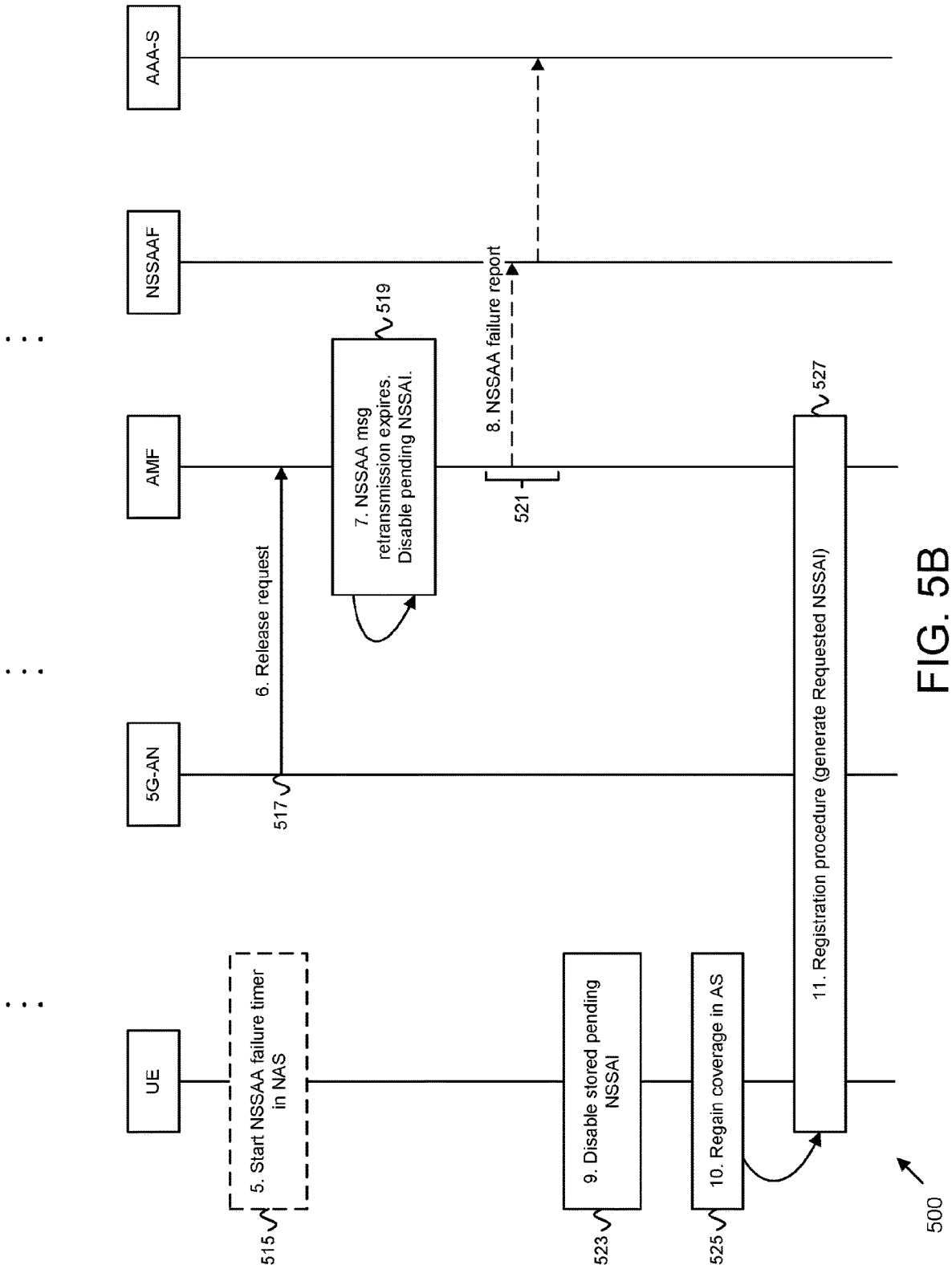
FIG. 5B is a continuation of FIG. 5A.

FIGS. 5A-5B depict an exemplary signaling flow 500 for the scenario of AS failure during the NSSAA procedure. Here, the NSSAA procedure involved the UE 205, a 5G access network (5G-AN) 501 (e.g., one embodiment of the RAN 120 containing the RAN node 210), the AMF 215, the NSSAAF 301 and the AAA-S 305. Note that in the depicted embodiment it is assumed that no AAA proxy is needed between the NSSAAF 301 and AAA-S 305. The steps of FIGS. 5A-5B are described as follows:

At Step 1, the UE 205 initiates a NAS Registration procedure (see block 505). Note that the steps of the registration procedure may conform with 3GPP TS 23.502, clause 4.2.2.

At Step 2, if one or more S-NSSAIs included in the requested NSSAI are subject of NSSAA, the AMF 215 determines to initiate the NSSAA procedure. Therefore, the AMF 215 may include in the Registration Accept message: a Pending NSSAI, NSSAA to be performed and an option-ally a new NSSAA failure guard time value (see messaging 507). Alternatively, the NSSAA failure guard time value may be pre-configured in the UE 205 (e.g., in the USIM), as described in other embodiments of this document. Note that the NSSAA failure guard time may start after the commu-nication failure (or transition to RRC-Idle) is indicated from the AS layer and there is stored Pending NSSAI.

At Step 3, the AMF 215 starts the NSSAA procedure with the UE 205 (see block 509). Here, the AMF 215 sends at least one NAS NSSAA command message to the UE 205 and receives at least one NAS NSSAA result from the UE 205. The AMF 215 exchanges EAP authentication messages with the AAA-S 305 via the NSSAAF 301, e.g., as described above with reference to FIG. 3A-3B. The EAP messages between the UE 205 and AAA-S 305 are encapsulated in NAS MM messages between the UE 205 and AMF 215, e.g., NETWORK SLICE-SPECIFIC AUTHENTICATION COMMAND, NETWORK SLICE-SPECIFIC AUTHENTI-CATION COMPLETE or NETWORK SLICE-SPECIFIC AUTHENTICATION RESULT, as described above with reference to FIG. 4. In the UE 205, the UE's NAS layer 260 exchanges the EAP messages with the UE's EAP client (or application) 503 (see messaging 511).

However, is the depicted scenario the NSSAA procedure 509 is not completed due to N1 connection release, e.g., caused by RLF or other failure in the AS layer. In such a case, the AMF 215 informs the AAA-S 305 about the failure of the NSSAA procedure. Or in alternative scenario, Steps 3a-3c of the NSSAA procedure 509 may be completed, but the AMF 215 may not be able to update the UE configuration (at Step 3d) with new allowed or Rejected NSSAI.

At Step 4, the AS in the UE 205 and the 5G-AN 501 determine persistent communication/transmission failure, e.g., RLF or the UE moves to a forbidden cell (see block 513). In the UE 205, the AS layer may indicate to the NAS layer 260 that a transition to the RRC-Idle state is per-formed. As used herein, "persistent communication failure" and "persistent transmission failure" refer to a failure whose duration is long enough to cause failure/cancellation of the ongoing procedure (e.g., EAP procedure). A persistent com-munication/transmission failure may be defined as a failure that lasts more than a threshold amount of time, where the threshold is selected to be long enough that the ongoing procedure fails. Note that different procedures (or different stages of a procedure) may have different threshold times used to define persistent communication/transmission fail-ure.

For example, RLF in the AS layer may be determined using the timers T310 (i.e., used for detecting physical layer problems for the in a cell upon a reaching a (threshold) number of consecutive out-of-sync indications from lower layers) and T311 (i.e., used for RRC connection re-establishment procedure). The timers T310 and T311 are defined in 3GPP TS 38.331. In some configurations, the RLF may take up to 31 seconds to be detected. In other embodiments, a network operator may use a different value to define/detect RLF.

Continuing on FIG. 5B, at conditional Step 5, after the indication from the AS layer to the NAS layer 260 about a persistent transmission failure, e.g., RLF or entering a forbidden cell, and there is stored Pending NSSAI, the NAS layer 260 may start a NSSAA failure timer with a guard time value as configured or received in the UE 205 in Step 2 (see block 515). This guard time value is calculated as described above, e.g., either Option 1 or Option 2.

At Step 6, in the 5G-AN 501, if the RAN node 210 determines the RLF, the RAN node 210 sends a NG-AP request message to the AMF 215 to release the N1 connection (see messaging 517).

At Step 7, upon indication from the 5G-AN 501 about N1 connection release, if the AMF 215 has outstanding NSSAA transport messages for transmission, then the AMF 215 may either A) terminate the NSSAA procedure, or B) continue to attempt the NSSAA messages re-transmission according to the T3575 timer (see block 519).

When the AMF 215 determines that the NSSAA procedure cannot be completed, the AMF 215 disables (i.e., deletes or marks as expired) the Pending NSSAI containing the S-NSSAIs for which the NSSAA has not been completed. The AMF 215 is aware that the that the UE 205 would also disable the Pending NSSAI. However, it is up to the UE 205 to initiate a new registration with the S-NSSAIs, for which the Pending NSSAI is disabled.

If the N1 connection release happens during Step 2 or before Step 11 from FIG. 3A-3B, i.e., as described in Case A of the FIG. 3A-3B, then the AMF 215 and AAA-S 305 would terminate the EAP procedure without storing any EAP result.

At Step 8 [conditional, therefore shown in dotted line], when the AMF 215 determines that the NSSAA procedure cannot be completed and if the exchange is before step 11 from FIG. 3A-3B (i.e., such that the AMF 215 is not aware yet about the EAP result of the NSSAA procedure, as described in Case A of the FIG. 3A-3B), the AMF 215 sends signaling towards the one or more AAA-S 305 via the NSSAAF 301 to inform the AAA-S 305 about the failure of the NSSAA procedure (see messaging 521).

The AMF 215 may include an appropriate failure cause value indicating to the AAA-S 305 the inability to complete the NSSAA procedure due to unreachable UE 205 or communication failure. The AAA-S 305 may not need to take any further actions or may not store any state for the authentication or authorization for the particular S-NSSAI.

At Step 9, after the AS layer indication is received in Step 4 and optional Step 5 is performed, the NAS layer 260 in the UE 205 may perform at least one of the following: A) disable the currently stored Pending NSSAI, i.e. delete or mark as expired the Pending NSSAI (see block 523; note that the UE 205 may keep the currently stored Allowed NSSAI and Rejected NSSAI); B) the NAS layer 260 may subscribe with the AS layer for notification when coverage is regained, i.e., a connection may be established again in the same cell or when a suitable cell becomes available; and C) set an internal flag that registration request message for mobility update needs to be sent to the network upon regaining of coverage. As used herein, the notation "Disabled/Pending" is used to refer to the Pending NSSAI after being disabled.

Note that the UE 205 may stay in CM-Idle state. In Case C of FIG. 3A-3B, i.e., the UE 205 has received and may store the EAP result in the EAP client 503 in the UE 205, but the NAS layer 260 of the UE 205 is not updated with the NSSAI configuration. Although the EAP client 503 in the UE 205 may store an EAP result of 'success', the EAP client 503 does not update the Pending NSSAI in the NAS layer.

At Step 10, when the AS layer determines that the UE 205 is in the coverage of a suitable cell, i.e., the UE 205 may regain connectivity, the AS indicates this to the NAS layer 260 (see block 525). This indication is a trigger to the NAS layer 260 to initiated registration procedure, e.g., for mobility update, with the network.

At Step 11, the NAS layer 260 generates and sends registration request message to the network, e.g., AMF 215 (see block 527). The registration request message may include requested NSSAI, whereas the UE 205 may include any of the S-NSSAIs which are already in the Allowed NSSAI and/or in the previously disabled Pending NSSAI.

In another embodiment, the UE 205 may include in the requested NSSAI request the network for Network Slice-Specific re-Authentication and re-Authorization (re-NSSAA) of the expired Pending NSSAI and/or Rejected NSSAI. The UE 205 may prioritize the expired Pending NSSAI in the request for re-NSSAA. If the UE 205 does not have any Allowed NSSAI, the UE 205 may not initiate any service until the re-NSSAA is performed and there is at least one or more S-NSSAIs in an Allowed NSSAI.

The benefit of this solution is that the UE 205 and AMF 215 disable the Pending NSSAI in a coordinated way. This allows the UE 205 to consider, at next registration procedure, for creating the requested NSSAI any of the S-NSSAIs from the disabled Pending NSSAI. If the AMF 215 stores the result of the NSSAA procedure, the AMF 215 may determine whether to include the S-NSSAI(s) in the Allowed NSSAI or in the Rejected NSSAI, without the need to perform again the NSSAA procedure.

In another embodiment, upon both events a) RLF from AS/RRC layer and/or b) NSSAA failure time expiry, the UE 205 may disable (i.e., delete or internally mark as expired) the Pending NSSAI without updating the Allowed NSSAI but may update Rejected NSSAI by inserting the S-NSSAIs of the expired Pending NSSAI in the Rejected NSSAI with a new cause value indicating failed NSSAA procedure. The UE 205 may stay in Idle state. Correspondingly, the AMF 215 may put the S-NSSAIs from the Pending NSSAI in the Rejected NSSAI with a new cause value indicating failed NSSAA procedure.

Figure 6:
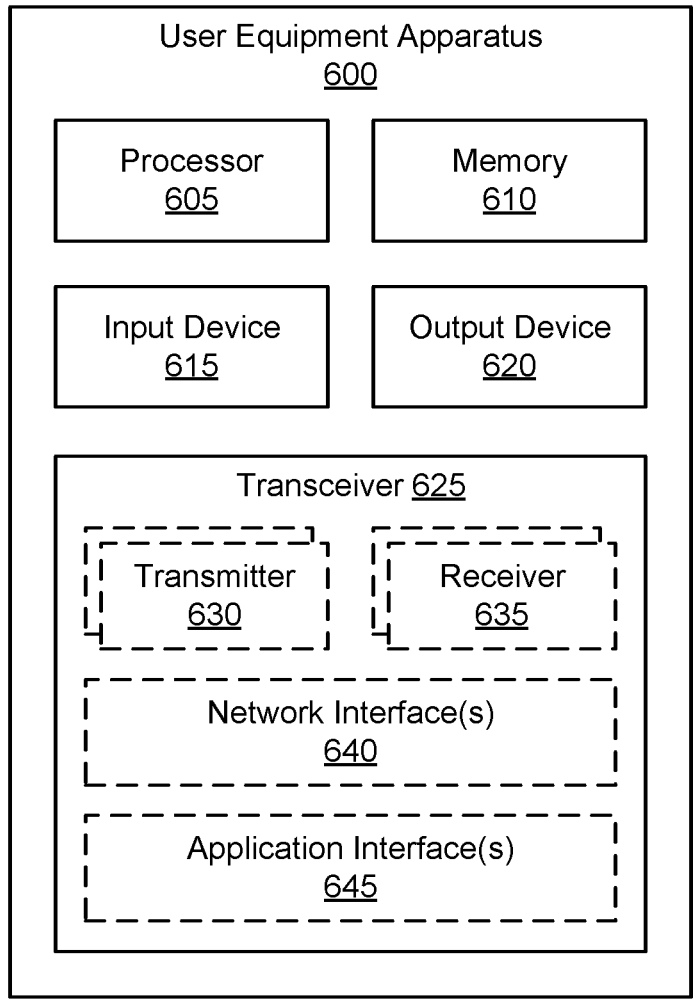
FIG. 6 is a block diagram illustrating one embodiment of a user equipment apparatus that may be used for disabling a pending NSSAI.

FIG. 6 depicts a user equipment apparatus 600 that may be used for disabling a pending NSSAI, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panels supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PC5, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit (CPU), a graphics processing unit (GPU), an auxiliary processing unit, a field programmable gate array (FPGA), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In certain embodiments, the processor 605 may include an application processor (also known as "main processor") which manages application-domain and operating system (OS) functions and a baseband processor (also known as "baseband radio processor") which manages radio functions.

In various embodiments, the processor 605 receives (i.e., internally) a RLF trigger from a lower layer (e.g., access stratum), where the RLF trigger occurs during an authentication procedure for a first network slice. The processor 605 disables a Pending NSSAI corresponding to the first network slice associated with the authentication procedure and receives (i.e., internally) an indication from the lower layer that radio coverage is available. The transceiver 625 sends a Registration Request in response to the indication that radio coverage is available, where the Registration Request includes an identifier (i.e., S-NSSAI) of the first network slice in a requested NSSAI.

In some embodiments, upon receiving the RLF trigger, the processor 605 subscribes to the lower layer for notification of when the radio coverage is available. In some embodiments, the requested NSSAI includes at least one S-NSSAI from an NSSAI configuration, where the NSSAI contains an Allowed NSSAI, a Rejected NSSAI, and/or the Disabled/Pending NSSAI.

In some embodiments, disabling the Pending NSSAI includes one of: a) clearing a pending state associated with at least one S-NSSAI belonging to the Pending NSSAI; b) deleting the Pending NSSAI; and c) marking as expired an S-NSSAI contained in the Pending NSSAI without deleting the Pending NSSAI. In some embodiments, disabling the Pending NSSAI includes not updating an Allowed NSSAI. In some embodiments, disabling the Pending NSSAI includes updating a Rejected NSSAI by inserting the disabled/expired Pending NSSAI.

In some embodiments, the authentication procedure for the network slice is a NSSAA procedure. Here, disabling the Pending NSSAI occurs in response to declaring (i.e., determining) failure of the NSSAA procedure. In certain embodiments, the processor 605 initiates a guard timer in response to receiving the RLF trigger from the lower layer. In such embodiments, the processor 605 declares/determines failure of the NSSAA procedure for the S-NSSAI(s) within the Pending NSSAI in response to expiration of the guard timer.

In one embodiment, the first apparatus contains a USIM containing the value of the guard timer. In another embodiment, the transceiver 625 receives a Registration Accept message containing the Pending NSSAI and a NSSAA failure guard time parameter. Here, the value of the guard timer is indicated by the NSSAA failure guard time parameter, the Registration Accept message being received prior to beginning the NSSAA procedure. In further embodiments, the Registration Accept message contains the Pending NSSAI and an indication that NSSAA is to be performed, where the first network slice is included in the Pending NSSAI.

The memory 610, in one embodiment, is a computer readable storage medium. In some embodiments, the memory 610 includes volatile computer storage media. For example, the memory 610 may include a RAM, including dynamic RAM (DRAM), synchronous dynamic RAM (SDRAM), and/or static RAM (SRAM). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to disabling a pending NSSAI and/or mobile operation. For example, the memory 610 may store various parameters, panel/beam configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, a Liquid Crystal Display (LCD), a Light-Emitting Diode (LED) display, an Organic LED (OLED) display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an Application-Specific Integrated Circuit (ASIC), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
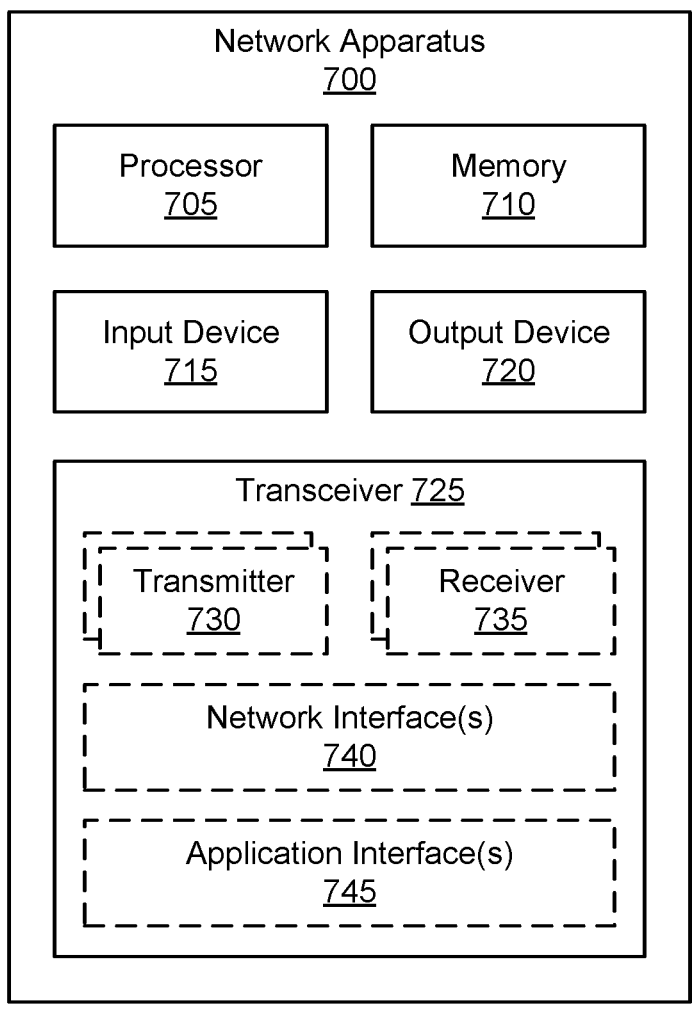
FIG. 7 is a block diagram illustrating one embodiment of a network apparatus that may be used for disabling a pending NSSAI.

FIG. 7 depicts a network apparatus 700 that may be used for disabling a pending NSSAI, according to embodiments of the disclosure. In one embodiment, network apparatus 700 may be one implementation of an evaluation device, such as the base unit 121 and/or the RAN node 210, as described above. Furthermore, the base network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the II) transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that communicates with one or more UEs, as described herein. In such embodiments, the processor 705 controls the network apparatus 700 to perform the above described RAN behaviors. When operating as a RAN node, the processor 705 may include an application processor (also known as "main processor") which manages application-domain and OS functions and a baseband processor (also known as "baseband radio processor") which manages radio functions.

In various embodiments, the processor 705 controls the apparatus 700 to perform the AMF behaviors described herein. In some embodiments, the transceiver 725 (e.g., supporting a network interface) receives a RLF trigger from a RAN node indicating RLF of a UE, where the RLF trigger occurs during an authentication procedure of a network slice. The processor 705 disables a Pending NSSAI corresponding to the network slice associated with the NSSAA procedure. The transceiver 725 further receives a Registration Request from the UE, where the Registration Request includes the network slice associated with the NSSAA procedure in a requested NSSAI.

In some embodiments, the requested NSSAI includes at least one S-NSSAI from an NSSAI configuration, where the NSSAI configuration includes an Allowed NSSAI, a Rejected NSSAI, and/or the Disabled/Pending NSSAI. In some embodiments, disabling the Pending NSSAI includes either deleting the Pending NSSAI or marking as expired an S-NSSAI contained in the Pending NSSAI without deleting the Pending NSSAI.

In some embodiments, the authentication procedure of the network slice is a NSSAA procedure. In such embodiments, disabling the Pending NSSAI occurs in response to declaring (i.e., determining) failure of the NSSAA procedure. In certain embodiments, the processor 705 initiates a guard timer in response to receiving the RLF trigger from the lower layer. In such embodiments, the processor 705 declares/determines failure of the NSSAA procedure for the S-NSSAI(s) within the Pending NSSAI in response to expiration of the guard timer.

In some embodiments, the processor 705 determines a value of the guard timer based on a total transmission number of NSSAA command/result messages and a re-transmission timer length. In certain embodiments, the transceiver 725 sends towards the UE a Registration Accept message containing the Pending NSSAI and a NSSAA failure guard time parameter, where the value of the guard timer is indicated by the NSSAA failure guard time parameter. Here, the Registration Accept message is transmitted prior to beginning the NSSAA procedure.

In one embodiment, the processor 705 calculates the guard value of the timer as greater than or equal to the product of the total transmission number of NSSAA command/result messages multiplied by the re-transmission timer length. In another embodiment, the processor 705 calculates the guard value of the timer as greater than or equal to the product of the total transmission number of NSSAA command/result messages multiplied by the re-transmission timer length, less a time for determining RLF.

In some embodiments, the authentication procedure of the network slice includes an EAP procedure for NSSAA. In certain embodiments, the transceiver 725 further receives an EAP result of the authentication procedure. In such embodiments, the processor 705 stores the EAP result upon disabling the Pending NSSAI. In other embodiments, the transceiver 725 does not receive an EAP result of the authentication procedure prior to receiving the RLF trigger. In such embodiments, the transceiver 725 further sends a failure message to an authentication server, said failure message contains a failure cause value, and the processor 705 further terminates the procedure for NSSAA.

The memory 710, in one embodiment, is a computer readable storage medium. In some embodiments, the memory 710 includes volatile computer storage media. For example, the memory 710 may include a RAM, including DRAM, SDRAM, and/or SRAM. In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to disabling a pending NSSAI. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the PLMN and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

Figure 8:
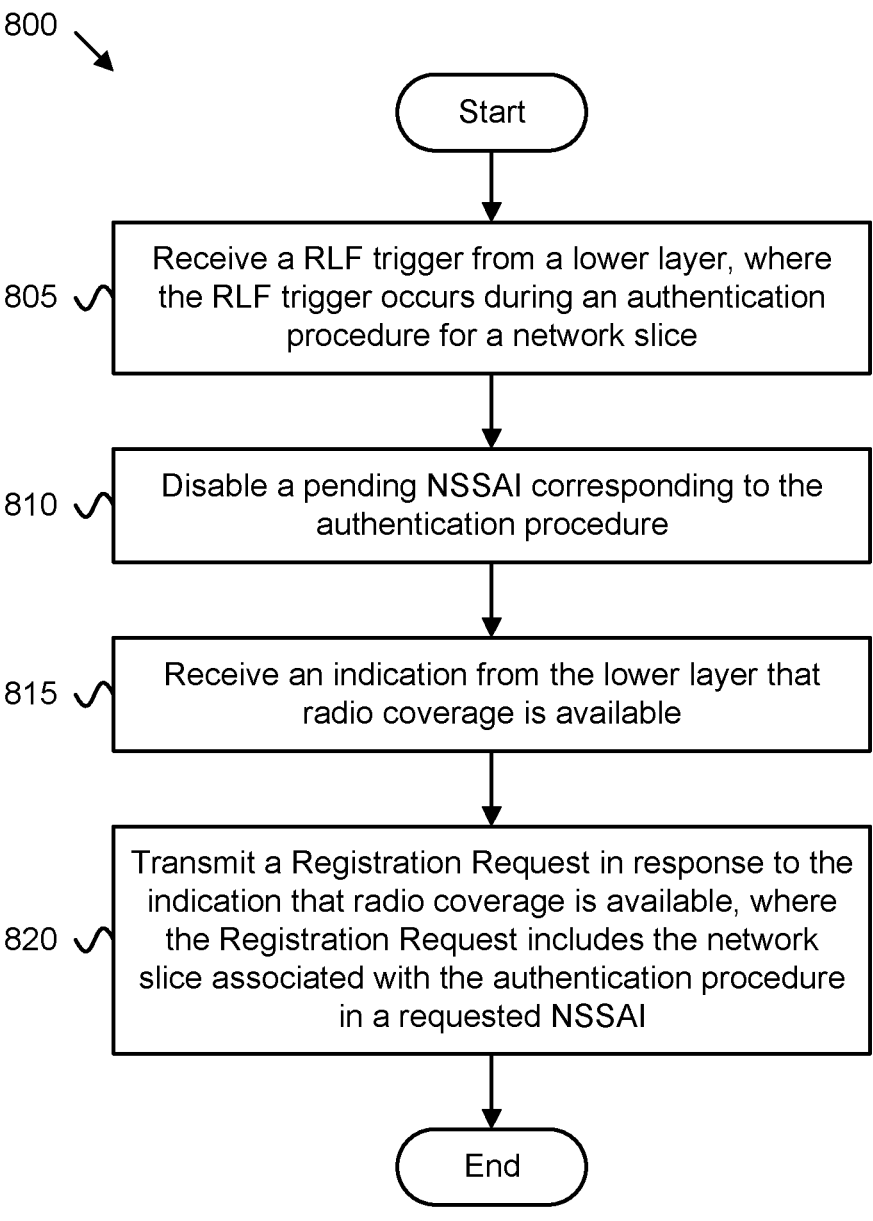
FIG. 8 is a flowchart diagram illustrating one embodiment of a first method for disabling a pending NSSAI.

FIG. 8 depicts one embodiment of a method 800 for disabling a pending NSSAI, according to embodiments of the disclosure. In various embodiments, the method 800 is performed by a user equipment device, such as the remote unit 105, the UE 205, and/or the user equipment apparatus 600, as described above. In some embodiments, the method 800 is performed by a processor, such as a microcontroller, a microprocessor, a CPU, a GPU, an auxiliary processing unit, a FPGA, or the like.

The method 800 begins and receives 805 a RLF trigger from a lower layer (e.g., access stratum). Here, the RLF trigger occurs during an authentication procedure for a network slice. The method 800 includes disabling 810 a Pending NSSAI corresponding to the authentication procedure. The method 800 includes receiving 815 an indication from the lower layer that radio coverage is available. The method 800 includes transmitting 820 a Registration Request in response to the indication that radio coverage is available. Here, the Registration Request includes the network slice associated with the authentication procedure in a requested NSSAI. The method 800 ends.

Figure 9:
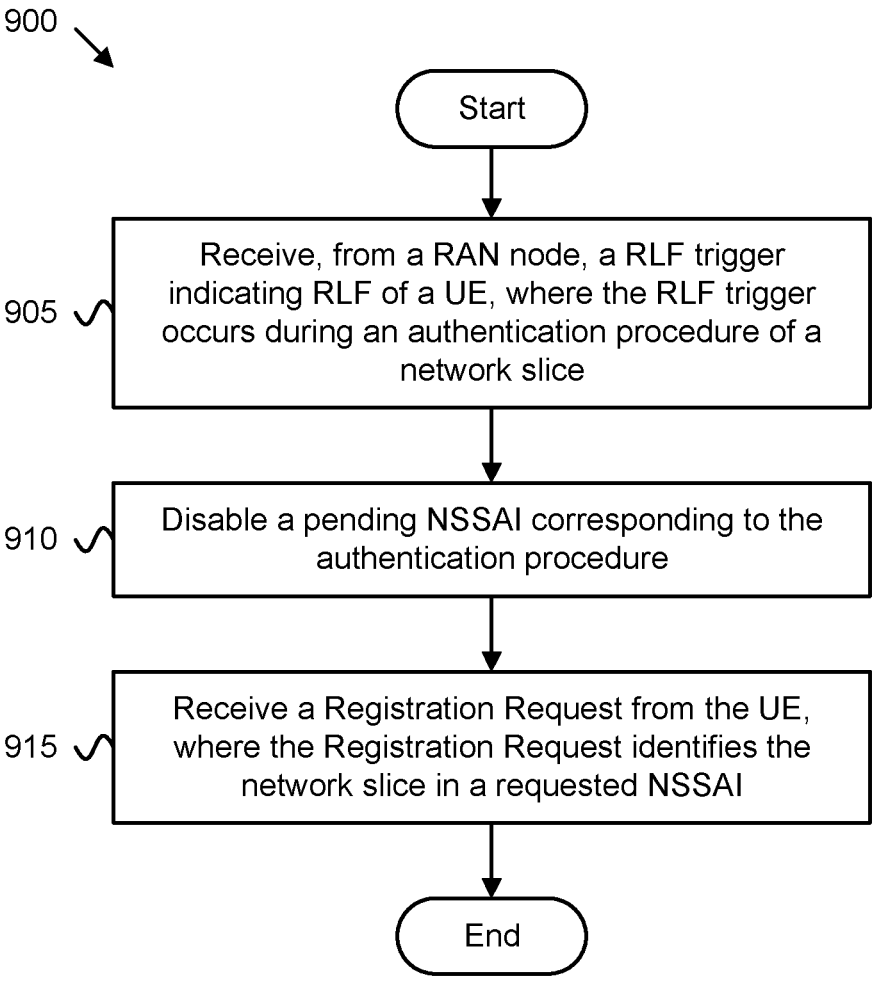
FIG. 9 is a flowchart diagram illustrating one embodiment of a second method for disabling a pending NSSAI.

FIG. 9 depicts one embodiment of a method 900 for disabling a pending NSSAI, according to embodiments of the disclosure. In various embodiments, the method 900 is performed by an AMF, such as the AMF 143, the AMF 215, and/or the network apparatus 700, as described above. In some embodiments, the method 900 is performed by a processor, such as a microcontroller, a microprocessor, a CPU, a GPU, an auxiliary processing unit, a FPGA, or the like.

The method 900 begins and receives 905, from a RAN node, a RLF trigger indicating RLF of a UE. Here, the RLF trigger occurs during an authentication procedure of a network slice. The method 900 includes disabling 910 a Pending NSSAI corresponding to the authentication procedure. The method 900 includes receiving 915 a Registration Request from the UE. Here, the Registration Request identifies the network slice in a requested NSSAI. The method 900 ends.

Disclosed herein is a first apparatus for disabling a pending NSSAI, according to embodiments of the disclosure. The first apparatus may be implemented by a UE device, such as the remote unit 105, the UE 205, and/or the user equipment apparatus 600, described above. The first apparatus includes a transceiver (i.e., of a radio interface) and a processor that receives a RLF trigger from a lower layer (e.g., access stratum), where the RLF trigger occurs during an authentication procedure for a first network slice. The processor disables a Pending NSSAI corresponding to the first network slice associated with the authentication procedure and receives an indication from the lower layer that radio coverage is available. The transceiver sends a Registration Request in response to the indication that radio coverage is available, where the Registration Request includes an identifier (i.e., S-NSSAI) of the first network slice in a requested NSSAI.

In some embodiments, upon receiving the RLF trigger, the processor subscribes to the lower layer for notification of when the radio coverage is available. In some embodiments, the requested NSSAI includes at least one S-NSSAI from an NSSAI configuration, where the NSSAI contains an Allowed NSSAI, a Rejected NSSAI, and/or the Disabled/Pending NSSAI.

In some embodiments, disabling the Pending NSSAI includes one of: a) clearing a pending state associated with at least one S-NSSAI belonging to the Pending NSSAI; b) deleting the Pending NSSAI; and c) marking as expired an S-NSSAI contained in the Pending NSSAI without deleting the Pending NSSAI. In some embodiments, disabling the Pending NSSAI includes not updating an Allowed NSSAI. In some embodiments, disabling the Pending NSSAI includes updating a Rejected NSSAI by inserting the disabled/expired Pending NSSAI.

In some embodiments, the authentication procedure for the network slice is a NSSAA procedure. Here, disabling the Pending NSSAI occurs in response to declaring (i.e., determining) failure of the NSSAA procedure. In certain embodiments, the processor initiates a guard timer in response to receiving the RLF trigger from the lower layer. In such embodiments, the processor declares/determines failure of the NSSAA procedure for the S-NSSAI(s) within the Pending NSSAI in response to expiration of the guard timer.

In one embodiment, the first apparatus contains a USIM containing the value of the guard timer. In another embodiment, the transceiver receives a Registration Accept message containing the Pending NSSAI and a NSSAA failure guard time parameter. Here, the value of the guard timer is indicated by the NSSAA failure guard time parameter, the Registration Accept message being received prior to beginning the NSSAA procedure. In further embodiments, the Registration Accept message contains the Pending NSSAI and an indication that NSSAA is to be performed, where the first network slice is included in the Pending NSSAI.

Disclosed herein is a first method for disabling a pending NSSAI, according to embodiments of the disclosure. The first method may be performed by a UE device, such as the remote unit 105, the UE 205, and/or the user equipment apparatus 600, described above. The first method includes receiving a RLF trigger from a lower layer (e.g., access stratum), where the RLF trigger occurs during an authentication procedure for a network slice. The first method includes disabling a Pending NSSAI corresponding to the authentication procedure and receiving an indication from the lower layer that radio coverage is available. The first method includes transmitting a Registration Request in response to the indication that radio coverage is available, where the Registration Request includes the network slice associated with the authentication procedure in a requested NSSAI.

In some embodiments, upon receiving the RLF trigger, the first method further includes subscribing to the lower layer for notification of when the radio coverage is available. In some embodiments, the requested NSSAI includes at least one S-NSSAI from an NSSAI configuration, where the NSSAI configuration contains an Allowed NSSAI, a Rejected NSSAI, and/or the Disabled/Pending NSSAI.

In some embodiments, disabling the Pending NSSAI includes one of: a) clearing a pending state associated with at least one S-NSSAI belonging to the Pending NSSAI, b) deleting the Pending NSSAI, and c) marking as expired an S-NSSAI contained in the Pending NSSAI without deleting the Pending NSSAI. In some embodiments, disabling the Pending NSSAI includes not updating an Allowed NSSAI. In some embodiments, disabling the Pending NSSAI includes updating a Rejected NSSAI by inserting the disabled/expired Pending NSSAI.

In some embodiments, the authentication procedure for the network slice is a NSSAA procedure. Here, disabling the Pending NSSAI occurs in response to declaring (i.e., determining) failure of the NSSAA procedure. In certain embodiments, the first method further includes initiating a guard timer in response to receiving the RLF trigger from the lower layer and declaring/determining failure of the NSSAA procedure for the S-NSSAI(s) within the Pending NSSAI in response to expiration of the guard timer.

In one embodiment, the UE contains a USIM containing the value of the guard timer. In another embodiment, the first method includes receiving a Registration Accept message containing the Pending NSSAI and a NSSAA failure guard time parameter. Here, the value of the guard timer is indicated by the NSSAA failure guard time parameter, the Registration Accept message being received prior to beginning the NSSAA procedure. In further embodiments, the Registration Accept message contains the Pending NSSAI and an indication that NSSAA is to be performed, where the first network slice is included in the Pending NSSAI.

Disclosed herein is a second apparatus for disabling a pending NSSAI, according to embodiments of the disclosure. The second apparatus may be implemented by an AME, such as the AMF 143, the AMF 215, and/or the network apparatus 700, described above. The second apparatus includes a processor and a transceiver (i.e., of a network interface) that receives a RLF trigger from a RAN node indicating RLF of a UE, where the RLF trigger occurs during an authentication procedure of a network slice. The processor disables a Pending NSSAI corresponding to the network slice associated with the NSSAA procedure. The transceiver further receives a Registration Request from the UE, where the Registration Request includes the network slice associated with the NSSAA procedure in a requested NSSAI.

In some embodiments, the requested NSSAI includes at least one S-NSSAI from an NSSAI configuration, where the NSSAI configuration includes an Allowed NSSAI, a Rejected NSSAI, and/or the Disabled/Pending NSSAI. In some embodiments, disabling the Pending NSSAI includes either deleting the Pending NSSAI or marking as expired an S-NSSAI contained in the Pending NSSAI without deleting the Pending NSSAI.

In some embodiments, the authentication procedure of the network slice is a NSSAA procedure. In such embodiments, disabling the Pending NSSAI occurs in response to declaring (i.e., determining) failure of the NSSAA procedure. In certain embodiments, the processor initiates a guard timer in response to receiving the RLF trigger from the lower layer. In such embodiments, the processor declares/determines failure of the NSSAA procedure for the S-NSSAI(s) within the Pending NSSAI in response to expiration of the guard timer.

In some embodiments, the processor determines a value of the guard timer based on a total transmission number of NSSAA command/result messages and a re-transmission timer length. In certain embodiments, the transceiver transmits a Registration Accept message containing the Pending NSSAI and a NSSAA failure guard time parameter, where the value of the guard timer is indicated by the NSSAA failure guard time parameter. Here, the Registration Accept message is transmitted prior to beginning the NSSAA procedure.

In one embodiment, the processor calculates the guard value of the timer as greater than or equal to the product of the total transmission number of NSSAA command/result messages multiplied by the re-transmission timer length. In another embodiment, the processor calculates the guard value of the timer as greater than or equal to the product of the total transmission number of NSSAA command/result messages multiplied by the re-transmission timer length, less a time for determining RLF.

In some embodiments, the authentication procedure of the network slice includes an EAP procedure for NSSAA. In certain embodiments, the transceiver further receives an EAP result of the authentication procedure. In such embodiments, the processor stores the EAP result upon disabling the Pending NSSAI. In other embodiments, the transceiver does not receive an EAP result of the authentication procedure prior to receiving the RLF trigger. In such embodiments, the transceiver further sends a failure message to an authentication server, said failure message contains a failure cause value, and the processor further terminates the procedure for NSSAA.

Disclosed herein is a second method for disabling a pending NSSAI, according to embodiments of the disclosure. The second method may be performed by an AMF, such as the AMF 143, the AMF 215, and/or the network apparatus 700, described above. The second method includes receiving a RLF trigger from a RAN node indicating RLF of a UE, where the RLF trigger occurs during an authentication procedure of a network slice. The second method includes disabling a Pending NSSAI corresponding to the authentication procedure of the network slice and receiving a Registration Request from the UE, where the Registration Request identifies the network slice in a requested NSSAI.

In some embodiments, the authentication procedure of the network slice is a NSSAA procedure. In such embodiments, disabling the Pending NSSAI occurs in response to declaring/determining failure of the NSSAA procedure. In certain embodiments, the second method includes initiating a guard timer in response to receiving the RLF trigger from the lower layer and declaring (i.e., determining) failure of the NSSAA procedure for the S-NSSAI(s) within the Pending NSSAI in response to expiration of the guard timer.

In some embodiments, the second method includes determining a value of the guard timer based on a total transmission number of NSSAA command/result messages and a re-transmission timer length. In certain embodiments, the second method includes transmitting a Registration Accept message containing the Pending NSSAI and a NSSAA failure guard time parameter, where the value of the guard timer is indicated by the NSSAA failure guard time parameter. Here, the Registration Accept message is transmitted prior to beginning the NSSAA procedure, where the first network slice is included in the Pending NSSAI.

In one embodiment, the value of the guard timer is calculated as greater than or equal to the product of the total transmission number of NSSAA command/result messages multiplied by the re-transmission timer length. In another embodiment, the value of the guard timer is calculated as greater than or equal to the product of the total transmission number of NSSAA command/result messages multiplied by the re-transmission timer length, less a time for determining RLF.

In some embodiments, the authentication procedure of the network slice includes an EAP procedure for NSSAA. In certain embodiments, the second method may further include receiving an EAP result of the authentication procedure. In such embodiments, the second method includes storing the EAP result upon disabling the Pending NSSAI. In other embodiments, an EAP result of the authentication procedure is not received prior to receiving the RLF trigger. In such embodiments, the first method may further include sending a failure message to an authentication server (e.g., AAA server), said failure message contains a failure cause value and terminating the procedure for NSSAA.

In some embodiments, the requested NSSAI includes at least one S-NSSAI from an NSSAI configuration, where the NSSAI configuration includes an Allowed NSSAI, a Rejected NSSAI, and/or the Disabled/Pending NSSAI. In some embodiments, disabling the Pending NSSAI includes either deleting the Pending NSSAI or marking as expired an S-NSSAI contained in the Pending NSSAI without deleting the Pending NSSAI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:

a memory; and a processor coupled with the memory and configured to cause the UE to:

receive, from a lower layer, a first indication of a radio link failure trigger, wherein the radio link failure trigger occurs during an authentication of a network slice, and wherein the radio link failure trigger corresponds to unavailable cell coverage;

disable a pending network slice selection assistance information (NSSAI) associated with the network slice based at least in part on the radio link failure trigger;

receive, from the lower layer and after disabling the pending NSSAI, a second indication indicating available cell coverage; and transmit a registration request for the network slice in response to the available cell coverage, wherein the registration request comprises a requested NSSAI, and wherein the requested NSSAI comprises one or more single network slice selection assistance information (S-NSSAI) associated with the pending NSSAI.

2. The UE of claim 1, wherein the requested NSSAI further comprises one or more S-NSSAI associated with a configured NSSAI, an allowed NSSAI, a rejected NSSAI, or any combination thereof.

3. The UE of claim 1, wherein the processor is configured to cause the UE to:

perform a network slice-specific authentication and authorization (NSSAA) procedure, and wherein the processor is configured to cause the UE to:

initiate a timer in response to the first indication of the radio link failure trigger; and disable the pending NSSAI in response to an expiration of the timer.

4. The UE of claim 3, wherein the processor is configured to cause the UE to:

receive a registration accept message prior to performing the NSSAA procedure, wherein the registration accept message comprises the pending NSSAI, an indication to perform the NSSAA, or an NSSAA parameter, or any combination thereof, and wherein a value of the timer is indicated by the NSSAA parameter.

5. The UE of claim 3, further comprising:

a universal subscriber identity module (USIM) configured to store a value of the timer.

6. The UE of claim 1, wherein to disable the pending NSSAI, the processor is configured to cause the UE to:

clear a state associated with a single network slice selection assistance information (S-NSSAI) of the pending NSSAI;

delete the pending NSSAI; or mark the S-NSSAI as expired without deletion of the pending NSSAI.

7. The UE of claim 1, wherein to receive, from the lower layer, the second indication indicating the available cell coverage is based at least in part on a subscription to the lower layer.

8. The UE of claim 1, wherein to disable the pending NSSAI, the processor is configured to cause the UE to refrain from updating an allowed NSSAI.

9. The UE of claim 1, wherein to disable the pending NSSAI, the processor is configured to cause the UE to update a rejected NSSAI to include the pending NSSAI.

10. A method performed by a user equipment (UE), the method comprising:

receiving, from a lower layer, a first indication of a radio link failure trigger, wherein the radio link failure trigger occurs during an authentication procedure of a network slice, and wherein the radio link failure trigger corresponds to unavailable cell coverage;

disabling a pending network slice selection assistance information (NSSAI) associated with network slice based at least in part on the radio link failure trigger; and receiving, from the lower layer and after disabling the pending NSSAI, a second indication indicating available cell coverage; and transmitting a registration request for the network slice in response to the available cell coverage, wherein the registration request comprises a requested NSSAI, and wherein the request NSSAI comprises a single network slice selection assistance information (S-NSSAI) associated with the pending NSSAI.

11. An access and mobility management function (AMF) apparatus comprising:

a memory; and a processor coupled with the memory and configured to cause the AMF apparatus to:

receive, from a base station, an indication of a radio link failure trigger associated with a user equipment (UE), wherein the radio link failure trigger occurs during an authentication procedure of a network slice;

disable a pending network slice selection assistance information (NSSAI) associated with the network slice based at least in part on the radio link failure trigger; and receive, from the UE and after disabling the pending NSSAI, a registration request for the network slice, where the registration request comprises a requested NSSAI, and wherein the request NSSAI comprises a single network slice selection assistance information (S-NSSAI) associated with the pending NSSAI.

12. The AMF apparatus of claim 11, wherein the processor is configured to cause the AMF apparatus to:

perform a network slice-specific authentication and authorization (NSSAA) procedure, and wherein the processor is configured to cause the AMF apparatus to:

initiate a timer in response to the first indication of the radio link failure trigger; and disable the pending NSSAI in response to an expiration of the timer.

13. The AMF apparatus of claim 12, wherein instructions are further executable by the processor to cause the AMF apparatus to determine a value of the timer based on a total transmission number of NSSAA command/result messages and a length of a re-transmission timer.

14. The AMF apparatus of claim 13, wherein the value of the timer is greater than or equal to a product of the total transmission number of NSSAA command/result messages multiplied by the length of the re-transmission timer.

15. The AMF apparatus of claim 13, wherein the value of the timer is greater than or equal to a product of the total transmission number of NSSAA command/result messages multiplied by the length of the re-transmission timer, less a time for determining radio link failure.

16. The AMF apparatus of claim 12, wherein the processor is configured to cause the AMF apparatus to transmit a registration accept message prior to performing the NSSAA procedure, wherein the registration accept message comprises the pending NSSAI, an NSSAA parameter, or both, and wherein a value of the timer is indicated by the NSSAA parameter.

17. The AMF apparatus of claim 11, wherein the requested NSSAI further comprises one or more S-NSSAI associated with a configured NSSAI, an allowed NSSAI, a rejected NSSAI, or any combination thereof.

18. The AMF apparatus of claim 11, wherein to disable the pending NSSAI, the processor is configured to cause the AMF apparatus to:

delete the pending NSSAI; or mark a S-NSSAI of the pending NSSAI as expired without deleting the pending NSSAI.

19. The AMF apparatus of claim 11, wherein the processor is configured to cause the AMF apparatus to:

perform an extensible authentication protocol ("EAP") procedure for network slice-specific authentication and authorization (NSSAA);

receive an EAP result of the authentication procedure; and store the EAP result in response to disabling the pending NSSAI.

20. The AMF apparatus of claim 11, wherein the processor is configured to cause the AMF apparatus to:

perform an extensible authentication protocol ("EAP") procedure for network slice-specific authentication and authorization (NSSAA), wherein the AMF apparatus does not receive an EAP result of the authentication procedure prior to receiving the indication of the radio link failure trigger;

transmit, to an authentication server, a failure message comprising a failure cause value based at least in part on the indication of the radio link failure trigger; and terminate the EAP procedure for NSSAA.

\* \* \* \* \*